US010547460B2

(12) United States Patent
Wang et al.

(10) Patent No.: US 10,547,460 B2
(45) Date of Patent: Jan. 28, 2020

(54) MESSAGE-BASED KEY GENERATION USING PHYSICAL UNCLONABLE FUNCTION (PUF)

(71) Applicant: QUALCOMM Incorporated, San Diego, CA (US)

(72) Inventors: Peiyuan Wang, San Diego, CA (US); Chando Park, Irvine, CA (US); Jimmy Jianan Kan, San Diego, CA (US); Seung Hyuk Kang, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 384 days.

(21) Appl. No.: 15/356,112

(22) Filed: Nov. 18, 2016

(65) Prior Publication Data

US 2018/0145838 A1    May 24, 2018

(51) Int. Cl.
*H04L 9/32* (2006.01)
*G06F 21/73* (2013.01)
*H04L 9/08* (2006.01)

(52) U.S. Cl.
CPC ............ *H04L 9/3278* (2013.01); *G06F 21/73* (2013.01); *H04L 9/0866* (2013.01)

(58) Field of Classification Search
CPC ...... H04L 9/3278; H04L 9/0866; G06F 21/73
See application file for complete search history.

(56) References Cited

U.S. PATENT DOCUMENTS

| | | | |
|---|---|---|---|
| 8,379,856 B2 | 2/2013 | Potkonjak | |
| 8,667,265 B1 * | 3/2014 | Hamlet | H04L 9/0866 |
| | | | 326/80 |
| 8,918,647 B1 * | 12/2014 | Wallrabenstein | H04L 63/0853 |
| | | | 713/172 |
| 9,020,150 B2 | 4/2015 | Beckmann et al. | |
| 9,252,960 B2 | 2/2016 | Schrijen et al. | |
| 9,946,858 B2 * | 4/2018 | Wallrabenstein | G06F 21/31 |
| 2003/0204743 A1 * | 10/2003 | Devadas | G06F 21/31 |
| | | | 726/9 |
| 2010/0121315 A1 | 5/2010 | Trovato et al. | |
| 2012/0290845 A1 * | 11/2012 | Bares | H04L 9/3247 |
| | | | 713/170 |
| 2015/0006601 A1 * | 1/2015 | Aissi | G06F 21/60 |
| | | | 708/250 |

(Continued)

*Primary Examiner* — Michael R Vaughan
(74) *Attorney, Agent, or Firm* — Loza & Loza, LLP

(57) ABSTRACT

Exemplary features pertain to secure communications using Physical Unclonable Function (PUF) devices. Segments of a message to be encrypted are sequentially applied to a PUF device as a series of challenges to obtain a series of responses for generating a sequence of encryption keys, whereby a previous segment of the message is used to obtain a key for encrypting a subsequent segment of the message. The encrypted message is sent to a separate (receiving) device that employs a logical copy of the PUF device for decrypting the message. The logical copy of the PUF may be a lookup table or the like that maps all permissible challenges to corresponding responses for the PUF and may be generated in advance and stored in memory of the receiving device. The data to be encrypted may be further encoded to more fully exercise the PUF to enhance security. Decryption operations are also described.

30 Claims, 20 Drawing Sheets

(56) References Cited

U.S. PATENT DOCUMENTS

| | | | | |
|---|---|---|---|---|
| 2015/0341792 | A1* | 11/2015 | Walsh | H04W 12/08 |
| | | | | 713/171 |
| 2016/0048684 | A1 | 2/2016 | Kocher et al. | |
| 2016/0211974 | A1* | 7/2016 | Komano | H04L 63/06 |
| 2016/0227348 | A1* | 8/2016 | Guo | H04L 9/3278 |
| 2017/0142123 | A1* | 5/2017 | Komano | H04L 63/104 |
| 2019/0165954 | A1* | 5/2019 | Lu | H04L 9/3278 |

\* cited by examiner

*Exemplary Sequential PUF-based Secure Communications* — 800

During an initial enrollment procedure in a secure environment, apply all possible challenge values to a PUF of an IMD (or other device in need of secure communications) to generate all possible response values.

↓ 802

Securely transfer the challenge values and response values to a separate external device for storage therein as a logical copy of the PUF as lookup tables or the like.

↓ 804

Following implant, for each new communication session, generate an initial challenge value ($c_1$) within the IMD and transfer the value to the external device via a secure transmission link, such as by using an initial one-time public key of a public key/private key cryptographic procedure.

↓ 806

Encrypt patient data (or other data) in the IMD using the PUF by applying the initial challenge value to the PUF to generate a response and then applying the response to a key generator to generate a key for encrypting the data, wherein segments of the data to be encrypted are sequentially applied to the PUF so that a previous segment of data is used to encrypt a subsequent segment of data.

↓ 808

Transmit the encrypted data to the external device, which sequentially applies the encrypted data to its logical copy of the PUF along with the initial challenge value to generate response values for use in sequentially decrypting the data.

↓ 810

At the external device: generate commands for controlling the IMD; encrypt the commands using the logical copy of the PUF by applying the initial challenge value (or a modified version thereof) to the logical copy of the PUF to generate a response and then applying the response to a key generator to generate a key for encrypting the data, wherein segments of the commands to be encrypted are sequentially applied to the PUF copy so that a previous segment is used to encrypt a subsequent segment of a command; and then transmit the encrypted commands.

↓ 812

At the IMD, receive the encrypted commands and sequentially apply the encrypted commands to its PUF along with the initial challenge value (or the modified version thereof) to generate response values for use in sequentially decrypting the commands for processing therein.

*FIG. 8*

*Exemplary Operations for use with a
Physical Unclonable Function (PUF) Device*  1500

1502 — Apply a message to the PUF device to obtain a response value.

1504 — Obtain a cryptographic key from the response value.

1506 — Perform a cryptographic operation on the message using the cryptographic key.

*FIG. 15*

MESSAGE-BASED KEY GENERATION USING PHYSICAL UNCLONABLE FUNCTION (PUF)

BACKGROUND

Field of the Disclosure

Various features relate to cryptographic systems employing physical unclonable function (PUF) devices and, in particular, to systems for generating a sequential series of keys using a PUF device for encrypting messages for transmission.

Description of Related Art

Physical Unclonable Function (PUF) devices may be used to generate a unique and initially unpredictable output for use in uniquely identifying a device or for facilitating cryptographic functions. For example, inherent process variations in an integrated circuit (IC) device may be exploited to create a unique and random input/output (I/O) mapping. Examples of PUFs include: memory-based PUFs, ring oscillator-based PUFs and coating-based PUFs, etc. In one possible cryptographic implementation, which is not necessarily prior art to the features described herein, a device for transmitting an encoded message (i.e. a transmitter) may be configured to apply a challenge value to a PUF component within the transmitter to generate a unique response value, which is then applied to a key generator to generate a cryptographic key. The key is applied along with a message to be encrypted to a cryptographic engine or similar device to encrypt the message for transmission. A receiver may be pre-configured with a logical "copy" of the PUF, i.e. a set of lookup tables or the like that provides a listing of the responses corresponding to all permissible challenges for the PUF of a particular transmitter. During a setup procedure, all permissible challenge values are applied to the PUF of the transmitter to obtain the corresponding responses, which are then stored within the receiver for subsequent use. (This assumes the PUF of the transmitter is sufficiently robust to always provide the same response to a given challenge.) The receiver can then decrypt an encrypted message received from the transmitter by applying the same challenge value used by the transmitter to the PUF copy to thereby allow extraction of the same key. The key is applied along with the encrypted message to a decryption engine to decrypt the received message. So long as an attacker does not have access to the PUF of the transmitter or the logical copy of the PUF in the receiver, encrypted messages should be secure (assuming the PUF is large enough to provide a sufficiently large space of unique response values to prevent or discourage guessing attacks or the like).

Improvements to such systems are needed, particularly for use with low power devices such as Implantable Medical Devices (IMDs) where power considerations may limit the size of the PUF and hence may limit the strength of cryptographic security provided by the PUF.

SUMMARY

In one aspect, a method for use with a physical unclonable function (PUF) device includes: applying a message to the PUF device to obtain a response value; obtaining a cryptographic key from the response value; and performing a cryptographic operation on the message using the cryptographic key.

In another aspect, a device includes: a physical unclonable function (PUF) device; and a processor coupled to the PUF device, the processor configured to apply a message to the PUF device to obtain a response value, obtain a cryptographic key from the response value, and perform a cryptographic operation on the message using the cryptographic key.

In yet another aspect, a method for use with a logical copy of a physical unclonable function (PUF) device includes: applying a message to a logical copy of a PUF device to obtain a response value; obtaining a cryptographic key from the response value; and performing a cryptographic operation on the message using the cryptographic key.

In still another aspect, a device includes: a logical copy of a physical unclonable function (PUF) device; and a processor coupled to the logical copy of the PUF device, the processor configured to apply a message to the logical copy of a PUF device to obtain a response value, obtain a cryptographic key from the response value, and perform a cryptographic operation on the message using the cryptographic key.

BRIEF DESCRIPTION OF THE DRAWINGS

FIG. 8 is a flow diagram summarizing exemplary procedures for secure communications using a PUF and a logical copy of the PUF.

FIG. 15 summarizes exemplary procedures for use by an apparatus or device having a PUF, which may include encryption, decryption or other cryptographic operations.

DETAILED DESCRIPTION

Figure 1:
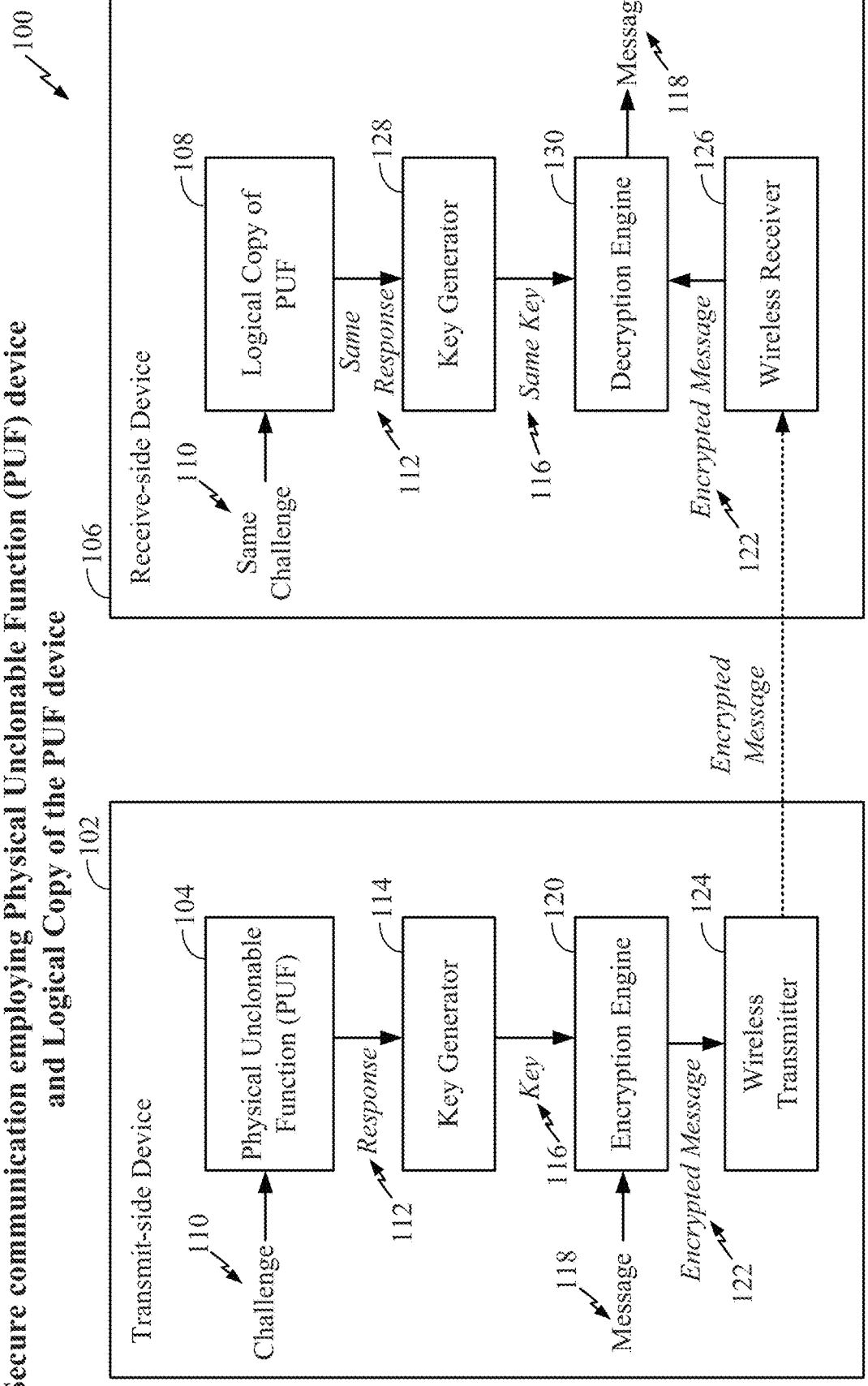
FIG. 1 is a high-level schematic block diagram illustrating selected components of a secure communication system employing a Physical Unclonable Function (PUF) device for encrypting messages and a logical copy of the PUF for decrypting messages.

In the following description, specific details are given to provide a thorough understanding of the various aspects of the disclosure. However, it will be understood by one of ordinary skill in the art that the aspects may be practiced without these specific details. For example, circuits may be shown in block diagrams in order to avoid obscuring the aspects in unnecessary detail. In other instances, well-known circuits, structures and techniques may not be shown in detail in order not to obscure the aspects of the disclosure.

The word "exemplary" is used herein to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation.

Overview

Several features pertain to methods and apparatus for use with computing components of wireless communication devices wherein physical unclonable function (PUF) devices are employed. Improvements may be achieved—particularly for use with low-power small-size devices such as implantable medical devices (IMDs) where power and circuit area considerations limit the size of the PUF—by configuring the device to sequentially apply segments of a message to be encrypted to the PUF to obtain the responses used to generate encryption keys. A device receiving the encrypted messages is configured with the corresponding inverse arrangement to apply segments of the encrypted message to a logical copy of the PUF to allow the same keys to be extracted, which are then used to decrypt the message. An initial challenge value may also be used. Note that the logical copy of the PUF may be a lookup table (LUT) or the like that maps all permissible challenges to corresponding responses for the particular PUF. The challenge/response values that form the logical copy are generated in advance by the device with the PUF and transferred to the receiving device (using a secure data transfer) for storage therein as the logical or "matched" copy of the PUF for subsequent use by the receiving device to decrypt messages sent by the device with the PUF.

With this architecture an encryption protocol is provided whereby segments of data are sequentially applied via the PUF to an encryption engine of the transmitting device so that a previous segment of data is used to encrypt a subsequent segment of data. A first segment of data is encrypted based on an initial challenge value (c1) by applying the initial challenge value to the PUF to obtain an initial response for generating an initial key. The initial key and the initial segment of message data are then applied to the encryption engine to generate the first segment of encrypted data for transmission. Each subsequent segment of message data is then encrypted based on a new key derived from the response obtained from the PUF from the prior segment of data. The reverse procedure is performed at the receiving device to decrypt incoming messages.

By sequentially applying segments of data to the PUF, a smaller PUF can be used within the transmitting device while still achieving adequate overall security, thus reducing circuit size and power requirements in the transmitting device (and also reducing the memory size of the corresponding logical copy of the PUF stored within the receiving device). Moreover, the PUF can be more thoroughly exercised because a range of varying input values is applied to it, rather than a single challenge (or a limited number of challenge values). For example, an encoder can be configured to take a narrow range of input values (such as a narrow range of systolic blood pressure values detected by the IMD) and expand the values into a wider range of values for more fully exercising the PUF. Note also that, for conventional public key communications, the receiving device needs both a public key and the encrypted message to decrypt the message. At least some of the features described herein enable secure communication without a public key, thereby reducing the size of data packets to be sent. Still further, the initial challenge value can be exposed to an attacker while still preserving security (so long as the PUF challenge/response pairs are not exposed).

The systems and procedures may be used to enable efficient use of a PUF for low-power area-limited security applications (such as IMDs). The systems and procedures can leverage a lightweight and compact hardware security block (incorporating a PUF) to provide a low-power solution for secure communications (such as IMD communications) where the PUF can be used to encrypt sensitive traffic. The system can provide data access management while maintaining data confidentiality and while reducing the total power consumption by reducing the size of data to be sent. These and other features will now be described with reference to the various figures.

FIG. 1 illustrates an exemplary PUF-based secure communication system 100 having a transmit-side device 102 with a PUF 104 and a receive-side device 106 with a logical copy 108 of the PUF. The transmit-side device 102 applies a predetermined challenge 110 to the PUF 104 to generate a response 112, which is applied to a key generator 114 to generate a key 116. The value of the key will depend on the challenge value and the unique characteristics of the PUF 104. The key 116 and a message 118 to be encrypted are then applied to an encryption engine 120 to generate an encrypted message 122, which is transmitted via a wireless transmitter 124 to the receive-side device 106 for reception by a wireless receiver 126. Upon receipt of the message, the receive-side device 106 applies the same challenge value 110 to the logical copy 108 of the PUF to generate the same response value 112. The response 112 is applied to a key generator 128 (which uses the same key generation procedures as key generator 114) to generate the corresponding (same) key 116. The key 116 is applied to a decryption engine 130 along with the received encrypted message 110 to obtain the (plaintext) message 118.

In this manner, a PUF and its logical copy are used to encrypt and decrypt messages. The logical copy 108 of the PUF may be a set of lookup tables or the like that provides a listing of the corresponding responses to all permissible challenges for the PUF 104. During an initial setup or enrollment procedure, all permissible challenge values may be applied to the PUF 104 to obtain and record its corresponding response values, which are stored within memory tables (not separately shown) in the receive-side device 106 for subsequent use as the logical copy 108. This assumes the PUF 104 is sufficiently robust to always provide the same response to a given challenge. For security reasons, the generation of the logical copy of the PUF, its storage within the receive-side device, and the generation and storage of the same challenge value within both the transmit-side and receive-side devices are all performed in a secure environment so a hacker cannot obtain access to the values. For example, the setup/enrollment procedures may be performed within a manufacturer's secure facility where the transmit-side and receive-side devices are fabricated. Thereafter, a hacker might gain access to the encrypted message via eavesdropping as it is transmitted from one device to the other but, without the challenge value and either the PUF or its logical copy, the hacker cannot easily decrypt the message.

Figure 2:
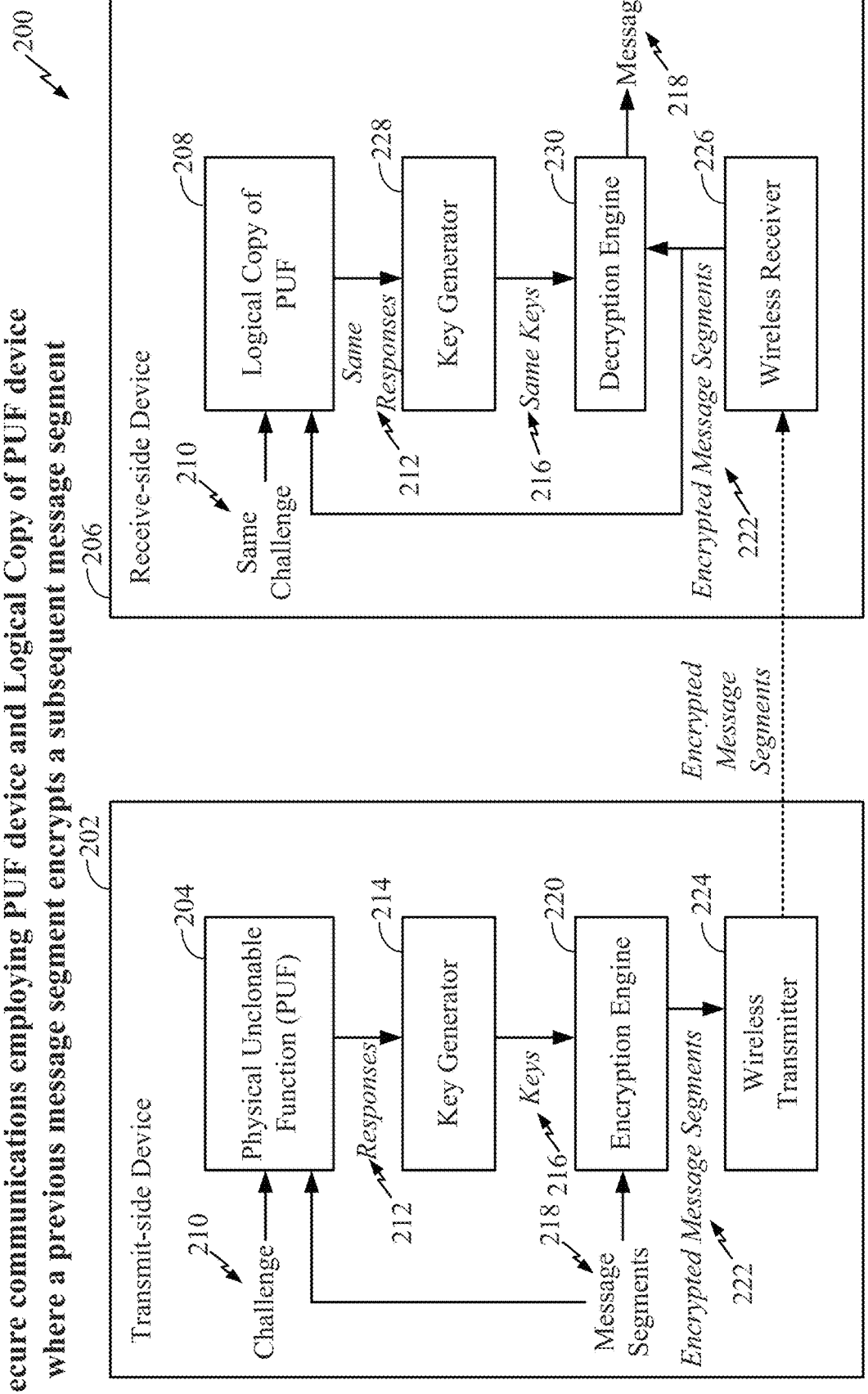
FIG. 2 is a high-level schematic block diagram illustrating selected components of a secure communication system employing a PUF device for encrypting messages and logical copy of the PUF device for decrypting the messages, where a previous message segment is used to encrypt a subsequent message segment.

FIG. 2 illustrates a modified version 200 of the exemplary PUF-based secure communication system equipped to sequentially apply segments of a message to a PUF to obtain a sequence of keys so that a previous segment of the message can be used to encrypt a subsequent segment of the message. The overall system again has a transmit-side device 202 with a PUF 204 and a receive-side device 206 with a logical copy 208 of the PUF. However, unlike the device of FIG. 1, the transmit-side device of FIG. 2 divides the message to be encrypted into message segments 218 and sequentially applies the message segments to both the PUF 204 and the encryption engine 220 with a delay therebetween. That is, during any particular iteration of the encryption procedure, the message segment applied to the PUF 204 will differ from the segment applied to the encryption engine 220 so that a previous segment encrypts a subsequent segment. As shown, the PUF 204 may also receive a challenge value 210 (which may be used as an initial challenge value if no message segment has yet been applied to the PUF).

Note that in this example the transmit-side device 202 applies either the initial (predetermined) challenge value 210 to the PUF 204 or the latest segment of the message so as to generate a series of changing responses 212, which are applied to a key generator 214 to generate a series of changing keys 216. The latest value of the key will depend on the particular challenge/segment value and the unique characteristics of the PUF 204. The latest key 216 and a corresponding segment of the message are then applied to an encryption engine 220 to obtain an encrypted message segment 222 so that a previous segment of the message may be used to encrypt a subsequent segment of the message.

The message segments 222 are transmitted via a wireless transmitter 224 to the receive-side device 206 for reception by a wireless receiver 226. Upon receipt of the encrypted message segments 222, the receive-side device 206 sequentially applies segments of the message to both the logical copy 208 of the PUF and a decryption engine 230. This allows a previously-received segment of the message to be used to decrypt a subsequently-received segment of the message using the reverse process of the transmit-side device. Again, the initial challenge value 210 may be applied to the logical copy 208 of the PUF to generate an initial response value if a first segment of the message has not yet been applied to the logical copy 208 of the PUF. Thereafter, the receive-side device 206 applies the latest segment of the message to the PUF copy to generate a series of changing responses 212, which are applied to a key generator 228 to generate a series of keys 216. The latest key 216 and a corresponding segment of the message to be decrypted are then applied to a decryption engine 230 to obtain a decrypted message segment 218 of the final (plaintext) decrypted message.

In this manner, a PUF and its logical copy are used to encrypt and decrypt messages while also using previous segments of a message to help encrypt subsequent segments of the message. This additional level of encryption may allow for a reduction in the size of the PUF while still achieving the same degree of security. For example, if a particular cryptographic application requires a challenge value that is 512-bits and a correspondingly-sized PUF to achieve an adequate degree of security, a similar application that also uses previous message segments to help encrypt subsequent message segments may achieve the same degree of security using a much smaller challenge value and a correspondingly smaller PUF. For small low-power devices such as IMDs, the use of shorter challenge values and a much smaller PUF can be particularly advantageous. Moreover, the logical copy of the PUF (which maps all possible challenge values to corresponding response values) will require far less memory space as well. For applications where a single receive-side device (such as a health monitoring system used by a physician's office to upload data from patient IMDs) may need to communicate with many transmit-side devices (i.e. the various IMDs of the many patients of the physician), the reduction in the memory required for each PUF copy may be quite advantageous too.

Note that an apparatus having the transmit-side device 202 with the PUF (such as an IMD) may also include receive-side components to receive and decrypt messages sent from another apparatus (such as an external heath monitor). Likewise, the apparatus having the receive-side device 206 with the logical copy of the PUF (e.g. the external heath monitor) may also include transmit-side components to encrypt and transmit messages. In such a system, the transmit-side components of the external device use the logical copy of the PUF to generate response values for obtaining keys to encrypt messages for sending to the IMD. The receive-side components of the IMD use the PUF of the IMD to generate response values to obtain keys to decrypt messages received from the external device. That is, the PUF of the IMD may be exploited both for encryption and decryption, and the copy of the PUF of the external device also may be exploited both for encryption and decryption. (See, the various examples, discussed below, of exemplary embodiments with devices having both transmit-side and receive-side components.)

Exemplary Transmit-Side and Receive-Side Devices

Figure 3:
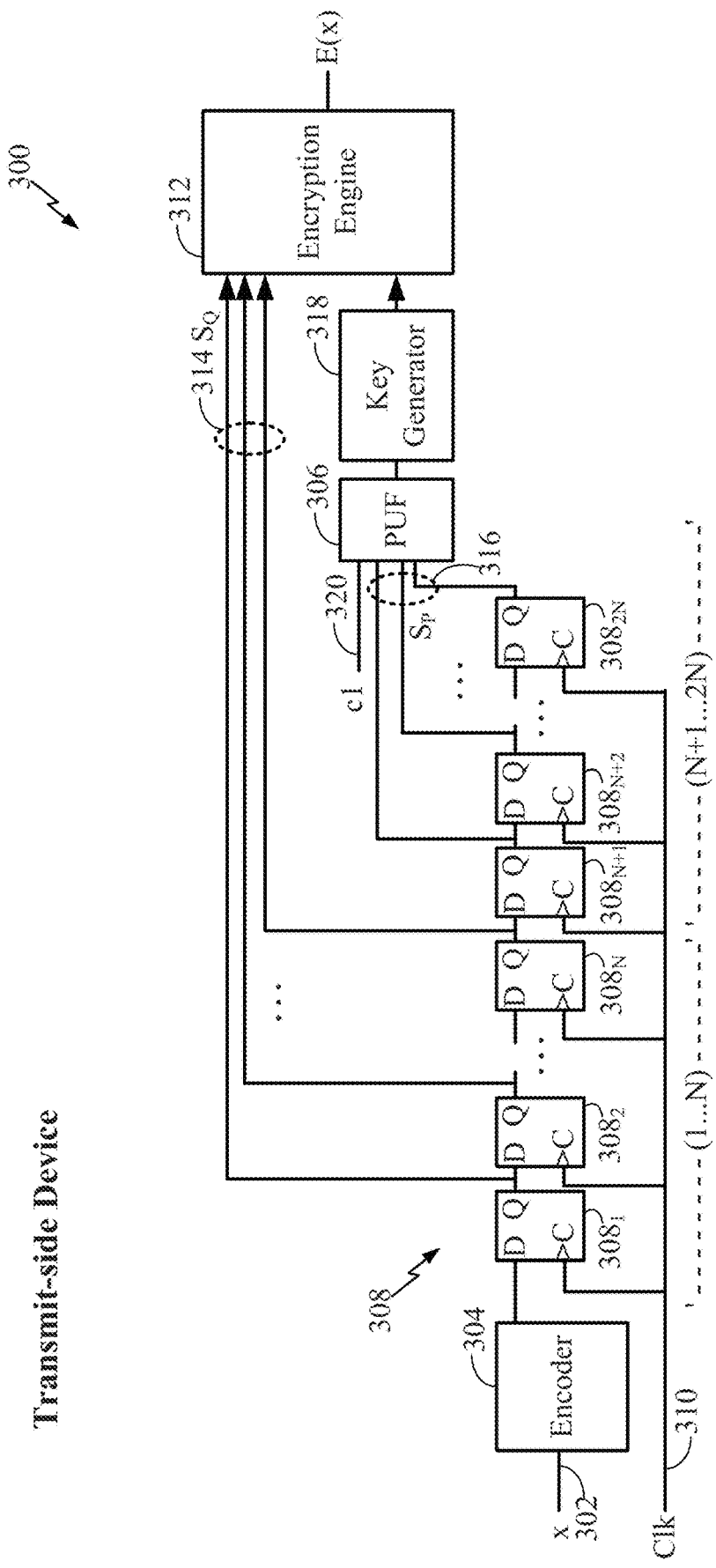
FIG. 3 is a schematic diagram of a transmit-side device employing a PUF device, where a previous message segment is used to encrypt a subsequent message segment.

FIG. 3 illustrates selected components of a transmit-side device 300 equipped to sequentially apply segments of a message to a PUF to obtain a sequence of keys, whereby a previous segment of the message is used to encrypt a subsequent segment of the message. In this example, a message (x) 302 to be encrypted is applied to a serial encoder 304, which may be configured, e.g., to expand a range of values of the message to more fully exercise a PUF device 306 (as will be discussed more fully below). The output bits of the serial encoder 304 are sequentially applied to a set of 2*N DQ flip-flops 308 connected in series and clocked by a clock signal 310, wherein individual flip-flops are denoted $308_{1...2N}$ in the figure and include a first group or subset of N flip-flops $308_{1...N}$ and a second group or subset of N flip-flops $308_{N+1...2N}$. The outputs from the first group of N flip-flops $308_{1...N}$ are applied both to a next flip-flop in the series and to an encryption engine 312 as $S_Q$ data 314. The outputs from the second group of N flip-flops $308_{N+1...2N}$ are applied both to a next flip-flop in the series and the PUF 306 as $S_P$ data 316.

Hence, in this particular example, there are a total of 2*N flip-flops arranged in two sequential groups of N flip-flops to segment the message into segments that are each N bits long. The first group of N flip-flops is configured to apply the N bits of a current segment of the message to the encryption engine 312 in parallel as $S_Q$. The second group of N of the flip-flops are configured to apply the N bits of the previous segment of the message to the PUF 306 in parallel as $S_P$. In this manner, while an initial N-bit segment of the message is applied to the PUF 306, a next N-bit segment of the message is applied to the encryption engine 312. The bits applied to the PUF 306 cause the PUF to generate a response that is applied to a key generator 318, which, in turn, generates a key that is also applied to the encryption engine 312. Thus, a key generated by a first N-bit segment of the message is used to encrypt a second N-bit segment of the message. A key generated by a second N-bit segment of the message is used to encrypt a third N-bit segment of the message, and so on. Note that, since a first segment of the message is applied to the encryption engine 312 before any message data is applied to the PUF 306, an initial N-bit challenge value 320 is applied to the PUF to generate the first response (which is then used to generate the first key for encrypting the first segment of the message). Note also that both the PUF 306 and the encryption engine 312 are configured to receive N-bits in parallel. Depending on its configuration, the output of the PUF 306 may be N-bits with the N bits also applied in parallel to the key generator 318. Likewise, the output of the key generator 318 may be N-bits, which are applied in parallel to encryption engine 312.

In one example, devices 306 and 312 are configured to process data every clock cycle. That is, the PUF generates a new response each clock cycle based on the N bits that are currently applied to the PUF and the encryption engine generates a new output value (E(x)) each clock cycle based on the N bits that are currently applied to the encryption engine. With that arrangement, the N-bit challenge value may be shifted each clock cycle to incorporate one new bit from the encoded message (using shift registers or the like) so that after N clock cycles the entire N bit challenge value has been replaced with an N-bit encoded message segment. In an alternative example, both devices (306 and 312) are configured to wait until all N bits of a message segment are available before processing the N bits of the segment in parallel (i.e. the PUF waits N clock cycles before generating its next response and the encryption engine also waits N cycles before generating its next encrypted output segment). Latches may be provided (not shown) within the devices to allow the devices to latch an entire N-bit segment worth of data before processing the N-bits. Note also that devices 306 and 308 may have different clock frequencies, particularly in examples where device 306 utilizes the entire N bit challenge value. The clock of device 308 may be stalled due to any delays caused by the processing within devices 306 and 318.

Generally speaking, any of a variety of sequential and/or segmented encryption procedures may be used to encrypt a message using techniques described herein, so long as the receive-side device can be equipped to perform the reverse process to permit decryption of the message. Note also that FIG. 3 does not necessarily show every component that might be used to implement the transmit-side device, such as the aforementioned latches or shift registers, or various clock lines feeding into devices 302, 306, 312 and 318, or various voltage sources and the like. Non-volatile components may be used so that the device is still loaded even after a power-off; when power is turned on, data encryption can resume without generating and sending another c1 (challenge value).

Figure 4:
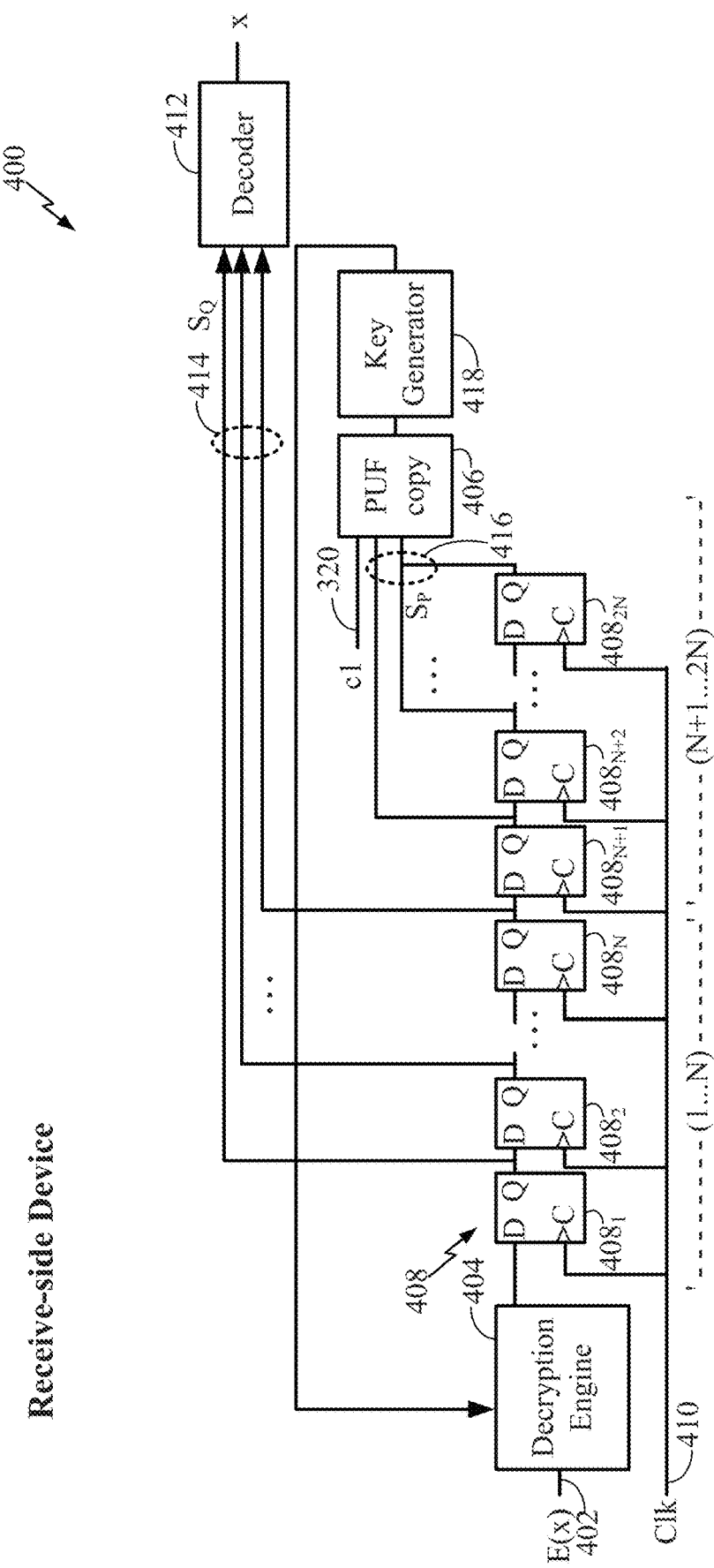
FIG. 4 is a schematic diagram of a receive-side device employing a logical PUF copy, where a previous message segment decrypts a subsequent message segment.

FIG. 4 illustrates selected components of a corresponding receive-side device 400 equipped to sequentially apply segments of an encrypted message to a logical copy of the PUF of the transmit-side device to obtain a sequence of keys so that a previous segment of the message can be used to decrypt a subsequent segment of the message. In this example, a first segment of an encrypted message E(x) 402 to be decrypted is applied to a decryption engine 404, which also receives the output from a key generator 418. For the first segment of the message, the same challenge value 320 used by the transmit-side device is applied to a PUF copy 406 (i.e. a logical copy of the PUF) to generate a response that is applied to the key generator 418 to generate a first key for decrypting the first segment of the message. The PUF copy 406 is configured to generate the same response as generated by the PUF 306 of the transmit-side device. The key generator 418 is configured to generate the same key as generated by the corresponding key generator 318 of the transmit-side device. The first key is applied to the decryption engine 404 to decrypt the first segment of the message. The first segment of the message is then sequentially applied to a set of DQ flip-flops 408 connected in series and clocked by a clock signal 410. The outputs from each of a first group of flip-flops $408_{1...N}$ are applied both to a next flip-flop in the series and to a decoder 412 as $S_Q$ data 414. The outputs from each of a second group of the flip-flops $408_{N+1...2N}$ are applied both to a next flip-flop in the series and to the PUF copy 406 as $S_P$ data 416.

As with the transmit-side device, there are a total of 2*N flip-flops and the message is segmented into message segments that are each N bits long. The first group of N flip-flops is configured to apply the N bits of a decrypted segment of the message to the decoder 412 in parallel as shown. The second group of N flip-flops is configured to apply the N bits of a previous (decrypted) segment of the message to the PUF copy 406 in parallel as also shown. In this manner, while an initial decrypted N-bit segment of the message is applied to the PUF copy 406, a next decrypted N-bit segment of the message is applied to the decoder 412. The decoder is configured to reverse the operation of the encoder of the transmit-side device to, e.g., return the values of the message to the original range of values. Note that, whereas the encoder of FIG. 3 is a serial encoder that receives input bits in series, the decoder of FIG. 4 is a parallel decoder that receives N bits in parallel. Alternatively, the decoder could be configured as a serial decoder that receives one bit at a time from one of the flip-flops.

In the receive-side device 400, the bits applied to the PUF copy 406 cause the PUF copy to generate a response that is applied to the key generator 418, which, in turn, generates a corresponding key that is also applied to the decryption engine 404 for decrypting the next segment of the message. In this manner, a key generated by a first N-bit segment of the decrypted message is used to decrypt a second N-bit segment of the message. A key generated by a second N-bit segment of the decrypted message is used to decrypt a third N-bit segment of the message, and so on. As already noted, the keys and the response values may be N-bits as well. Since a first N-bit segment of the encrypted message is applied to the decryption engine 404 before any decrypted message data is applied to the PUF copy 406, the initial challenge value 320 is applied to the PUF copy to generate the first response (which is then used to generate the first key for decrypting the first N-bit segment of the message). Note also that the first N-bit segment of data passes through the decryption engine 404 unchanged (since he decryption engine does not initially have a decryption key applied thereto).

As noted, both the PUF copy 406 and the decoder 412 are configured to receive N-bits in parallel (as shown). In one example, devices 406 and 412 of FIG. 4 are configured to process data every clock cycle. That is, the PUF copy generates a new response each clock cycle based on the N bits that are currently applied to the PUF copy and the decoder generates a new output value (x) each clock cycle based on the N bits that are currently applied to the decoder. Likewise, the decryption engine 404 may generate a new output value each clock cycle. The N-bit challenge value applied to the PUF copy may be shifted each clock cycle to incorporate one new bit from the decrypted message (using shift registers or the like) so that after N clock cycles the entire N-bit challenge value is replaced with an N-bit decrypted message segment. In the alternative example, the various devices are configured to wait until all N bits of a message segment are available before processing the N bits in parallel (i.e. the PUF copy waits N clock cycles before generating its next response and the decoder also waits N cycles before generating its next decoded output segment). Latches (not shown) may be provided within the devices to allow the devices to latch an entire N-bit segment worth of data before processing the N-bits, if needed.

Again, any of a variety of sequential and/or segmented decryption procedures may be used to decrypt a message so long as the receive-side device performs the reverse process from the transmit-side device. As with FIG. 3, FIG. 4 does not necessarily show every component that might be used to implement the receive-side device, such as the aforementioned latches or shift registers, or various clock lines feeding into devices 404, 406, 412 and 418, or various voltage sources and the like. Note also that to allow time for the first N-bit segment of data to be applied to the PUF copy, the receive-side device may need to wait 2*N clock cycles before activating the decoder and decryption engine. Non-volatile components may be used so that the device is still loaded even after power-off.

Summarizing FIGS. 3 and 4, the transmit-side device of FIG. 3 uses a previous segment of data as challenge to its PUF to, e.g., reduce the power for data transmitting and wherein, in at least some examples:

PUF(P) is a function $r=f_P(c)$;

A FIFO stores N-bit $S_P$ as a PUF challenge and N-bit $S_Q$ as data to be encrypted;

An initial data segment is encrypted by a key generated based on $f_P(c1)$; the following segments ($S_Q$) of data are encrypted by keys generated based on $f_P(S_Q)$; and The FIFO is implemented with flip-flops with non-volatile devices so that the FIFO is still loaded after power-off.

The receive-side device of FIG. 4 also uses a previous segment of data as challenge to PUF and wherein, in at least some examples:

After transmit-side device fabrication or prior to implantation (if the device is an IMD), challenge and response pairs (CPRs) of PUF(P) are enrolled in the receiver-side device as a logical copy of the PUF as a lookup table (LUT) or using an otherwise "matched PUF";

To decrypt the first segment of data, c1 is stored in the receiver-side device for key generation;

Subsequent segments of data are decrypted by a key generated based on $f_P(S_Q)$; and Encoder and decoder may be used to adjust data range to fully exercise PUF.

As noted above, an apparatus having a transmit-side device with a PUF (such as an IMD) may also include receive-side components to receive and decrypt messages sent from another apparatus. Likewise, an apparatus having receive-side device with the logical copy of the PUF (such as an external heath monitor) may also include transmit-side components to encrypt and transmit messages. With such a system, the transmit-side components of the external device use the logical copy of its PUF (e.g. PUF copy 406 of FIG. 4) to generate response values for obtaining keys to encrypt messages for sending to the IMD. The receive-side components of the IMD use its PUF (e.g. PUF 306) to generate response values to obtain keys to decrypt messages received from the external device. That is, an apparatus can be equipped with both the transmit-side components of FIG. 3 and a modified version of the receive-side components of FIG. 4 (where a PUF is substituted for the logical copy of the PUF shown in FIG. 4). Similarly, an apparatus can be equipped with both the receive-side components of FIG. 4 and a modified version of the transmit-side components of FIG. 3 (where a logical copy of the PUF is substituted for the PUF shown in FIG. 3). As such, a PUF may be exploited both for encryption and decryption and a copy of the PUF also may be exploited both for encryption and decryption. (See various figures, discussed below, for exemplary embodiments wherein devices have both transmit-side and receive-side components.)

Exemplary Implantable Medical Device (IMD) Implementations

Figure 5:
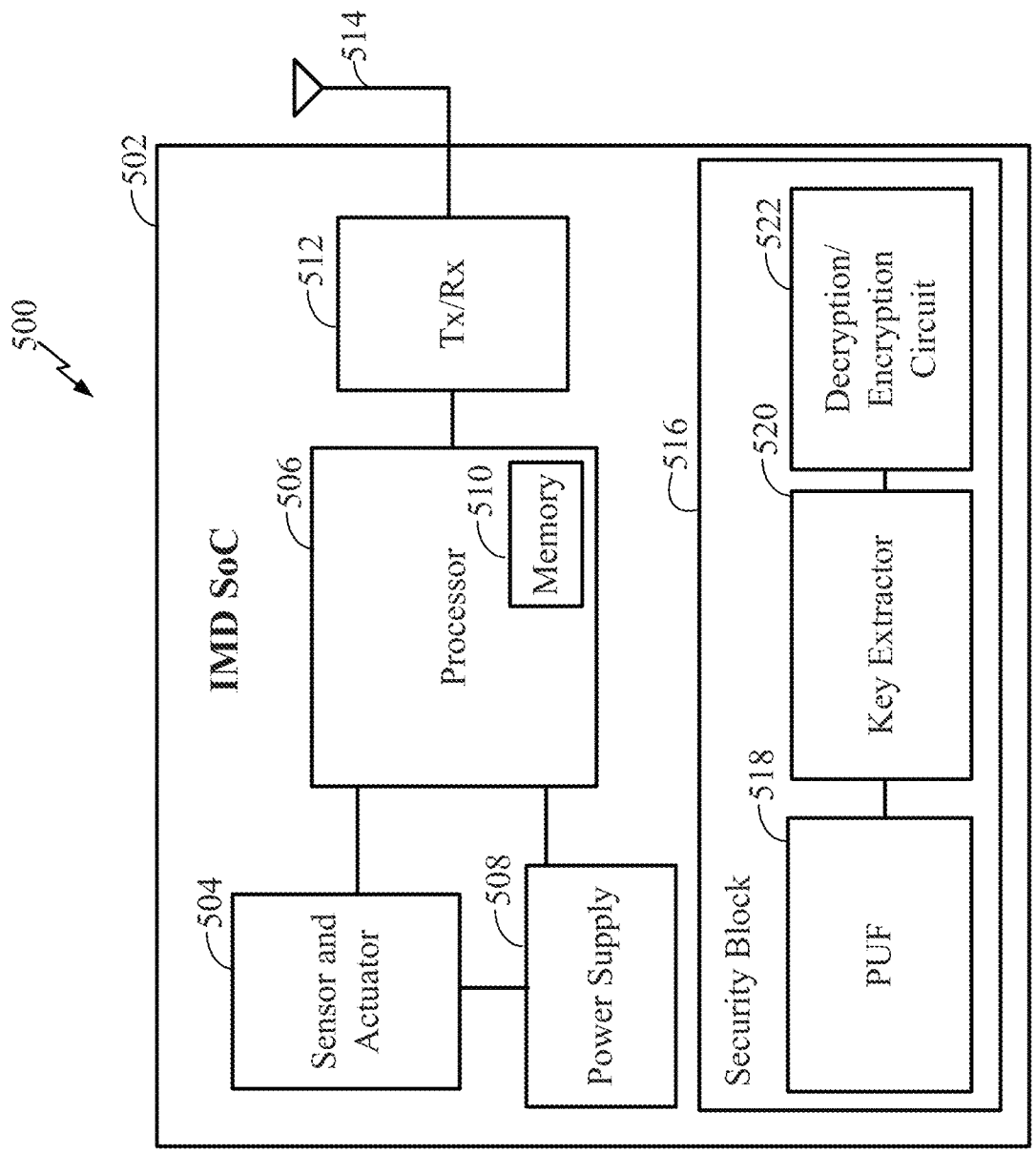
FIG. 5 is a high-level schematic block diagram illustrating selected components of an implantable medical device (IMD) providing secure communications using a PUF device for encrypting or decrypting messages.

FIG. 5 illustrates at a high level an exemplary IMD having a PUF for use encrypting/decrypting data. In the example of FIG. 5, an IMD 500 includes a system-on-a-chip (SoC) 502 including a sensor and actuator 504 for sensing patient data (such as nerve signals, cardiac electrical signals, etc.) and delivering therapy (such as pacing therapy, nerve stimulation, etc.) under the control of a main processor 506. Power is provided by a battery or other power supply 508. Data is stored in a memory 510 (which may be a component of the processor, as shown, or a separate component). Data and commands are transmitted and/or received via a transceiver (Tx/Rx) 512 and an antenna 514 (which for an IMD may include the outer metal casing of the device). The aforementioned PUF-based cryptographic operations are performed by a security block 516, which includes a PUF 518, a key extractor 520 and a decryption/encryption circuit 522.

Data from the sensor 504 is fed into a decryption/encryption circuit 522, which encrypts the data using one or more keys extracted from the PUF for sending encrypted data to an external device (such as a personal health hub, not shown in FIG. 5, that includes a logical copy of the PUF) and decrypts commands received from the external device (initially encrypted by the external device using the logical copy of the PUF). That is, in this example, the IMD is equipped to both encrypt and decrypt data and commands. The next two figures provide further details of exemplary IMD-based embodiments.

Figure 6:
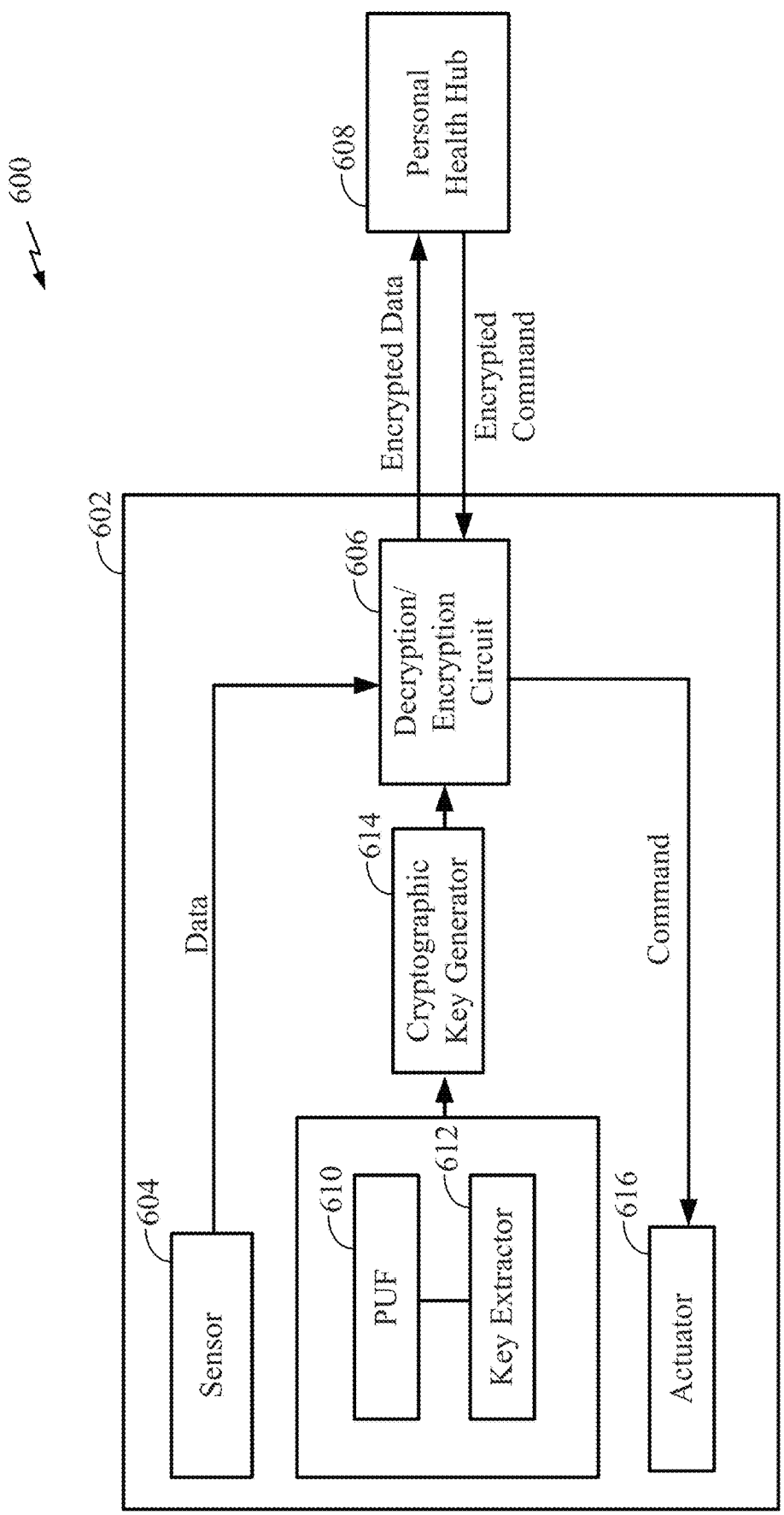
FIG. 6 is a high-level schematic block diagram illustrating selected components of an IMD using a PUF device for encrypting or decrypting messages for use in communication with an external personal health hub.

FIG. 6 illustrates selected components of a medical system 600 that includes an IMD 602 with a sensor 604 for sensing patient data such as nerve signals, cardiac electrical signals, blood pressure, etc., wherein the IMD is implanted within a patient. Data from the sensor 604 is fed into a decryption/encryption circuit 606, which encrypts the data for sending to an external personal health hub 608 and decrypts commands received from the health hub 608 using the PUF-based techniques described herein. That is, the IMD includes a PUF 610 in conjunction with a key extractor 612, which operates to apply a suitable predetermined challenge value to the PUF to obtain a response that is applied to a cryptographic key generator 614. The cryptographic key generator 614 generates an encryption key that is applied to the decryption/encryption circuit 606 to encrypt the data for sending to the health hub 608. (Note that all components of the IMD are not illustrated in FIG. 6 and the device may additionally include such components as a power supply, transceiver, etc.) The health hub 608 uses a PUF copy (not shown) along with the predetermined challenge value (which is also stored therein) to decrypt the data so that it may be reviewed by a clinician or processed by suitable analysis components.

In response, the health hub 608 may send encrypted commands to the IMD, such as commands to adjust the operation of the IMD to, for example, deliver or adjust therapy, as appropriate for the particular patient in which the IMD is implanted. The commands are encrypted by the health hub using its PUF copy along with predetermined challenge value. The initial predetermined challenge value may be shared between the IMD and the external health hub using secure communications prior to IMD implant such as by directly connecting the IMD to the heath bub or using other suitable techniques. The commands are decrypted by the IMD 602 using keys obtained from its PUF 610 and the challenge value, then used to control an actuator 616 which, as noted, may deliver or adjust therapy.

In this manner, the IMD 602 and the health hub 608 both incorporate transmit-side and receive-side components to allow the devices to encrypt and decrypt data and commands to prevent the eavesdropping of data or the spoofing of commands. Note that only the IMD includes the actual PUF. The health hub includes only the logical copy of the PUF. If the health hub is intended for use with only one IMD of one patient, then the hub only stores the logical copy of the PUF of that one IMD. If the health hub is provided for use with a patient with multiple IMDs, each of which includes its own PUF, then the health hub stores logical copies of each of the PUFs of those IMDs for that patient. If the health hub is provided for use by a physician or clinic to communicate with the IMDs of all the various patients of the physician or clinic, then the health hub may be equipped to store the logical copies of the various PUFs of the IMDs for numerous patients. Each logical copy of each PUF might be quite large, but a health hub may be equipped with a large amount of memory, unlike the various IMDs. Note also that in the example of FIG. 6, no public keys are used. The initial challenge value is maintained as a confidential and secure value in both the IMD and the external hub for use in generating a sequence of confidential and secure keys for encryption decryption.

Figure 7:
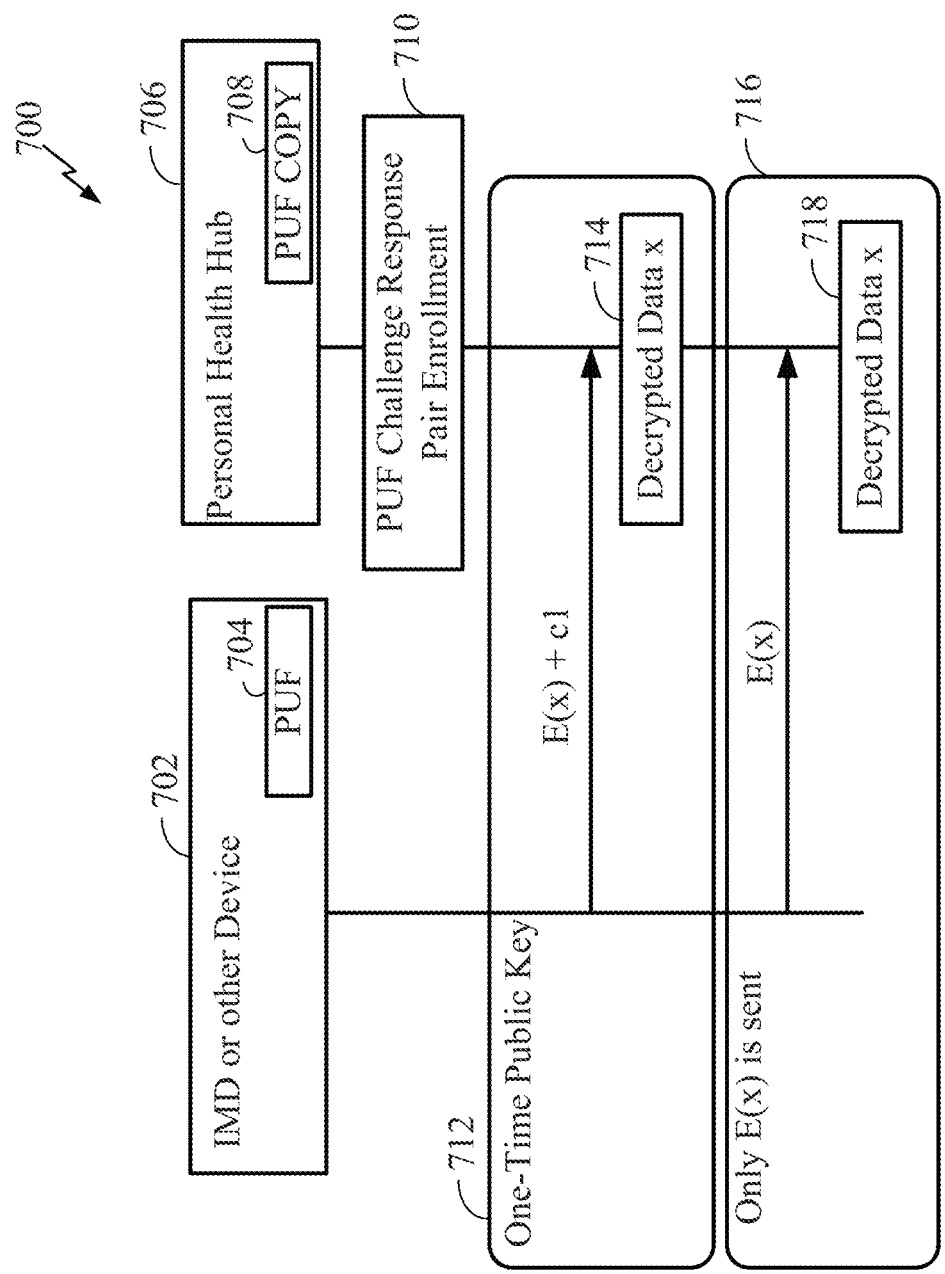
FIG. 7 is a high-level schematic block diagram illustrating a system and procedure whereby a one-time public key is employed along with a PUF.

FIG. 7 illustrates at a high level another exemplary system using a PUF as a component of an IMD. In the example of FIG. 7, a one-time public key is employed to facilitate secure transmission of the initial challenge value c1. Briefly, an IMD or other device 702 includes a PUF 704. A personal health hub or other external device 706 includes a PUF copy 708. The PUF copy is generated during an initial PUF challenge and response pair enrollment procedure 710 as described above, whereby all possible responses to all possible challenges are obtained for the PUF of the IMD and stored within the external device as a set of lookup tables or the like. For a first message transmission, a public key procedure 712 is employed wherein a one-time public key is used to secure the transmission of an encrypted message $E(x)$ and an initial challenge value c1. The personal health hub 706 uses otherwise conventional public/private key cryptographic procedures to decrypt the challenge value c1 so that it may then be used to decrypt the message $E(x)$ to yield decrypted data 714. Thereafter, at 716, only encrypted messages $E(x)$ are sent from the IMD 702 without any public/private key cryptographic procedures. The hub 706 uses the previously received challenge (or modified versions thereof) to decrypt the message data $E(x)$ to yield decrypted data 718. In this manner, only the initial transmission need include the challenge value c1, thus reducing the size to subsequent data packets, which can be beneficial with low power devices such as IMDs.

FIG. 8 is a flow diagram that summarizes at a high level operations performed by an IMD (or other device) having a PUF for use in encrypting and decrypting messages in conjunction with an external device provided with a logical copy of the PUF. Briefly, at 800, during an initial enrollment procedure in a secure environment, all possible challenge values are applied to a PUF of an IMD (or other device in need of secure communications) to generate all possible response values. At 802, the challenge values and response values are securely transferred to a separate external device for storage therein as a logical copy of the PUF as lookup tables or the like (such as by using a direct hard-wired connection before device implant). At 804, following device implant, for each new communication session, an initial challenge value (c1) is generated or otherwise obtained within the IMD and the value is transferred to the external device via a secure transmission link, such as by using an initial one-time public key of a public key/private key cryptographic procedure as discussed above. By "one-time," it is meant that the public key is used only once during a particular communication session, such as during a particular programming session where a clinician programs the operation of the IMD. A different public key may be used for a next communication session (with the various public keys being pre-determined and pre-stored in the IMD).

At 806, patient data (or other data) is encrypted in the IMD using the PUF of the IMD by applying the data and the initial challenge value to the PUF to generate responses and then applying the responses to a key generator to generate keys for encrypting the data, wherein segments of the data to be encrypted are sequentially applied to the PUF so that a previous segment of data is used to encrypt a subsequent segment of data, using techniques described above. At 808, the encrypted data is transmitted to the external device, which sequentially applies the encrypted data to its logical copy of the PUF along with the initial challenge value to generate response values for use in sequentially decrypting the data. At 810, the external device: generates commands for controlling the IMD; encrypts the commands using the logical copy of the PUF by applying the commands and the initial challenge value (or a modified version thereof) to the logical copy of the PUF to generate responses and then applying the responses to a key generator to generate keys for encrypting the commands, wherein segments of the commands to be encrypted are sequentially applied to the PUF copy so that a previous segment is used to encrypt a subsequent segment of a command; and then transmits the encrypted commands. Note that the IMD and the external device may have a predetermined procedure for modifying the challenge value so that the same initial challenge need not be used again but both devices will nevertheless know the current and correct version of the challenge value. For example, the challenge value might be incremented using a predetermined procedure known to both devices. At 812, the IMD receives the encrypted commands and sequentially applies the encrypted commands to its PUF along with the initial challenge value (or the modified version thereof) to generate response values for use in sequentially decrypting the commands for processing therein. The commands might, for example, control the IMD to initiate or adjust therapy.

Figure 9:
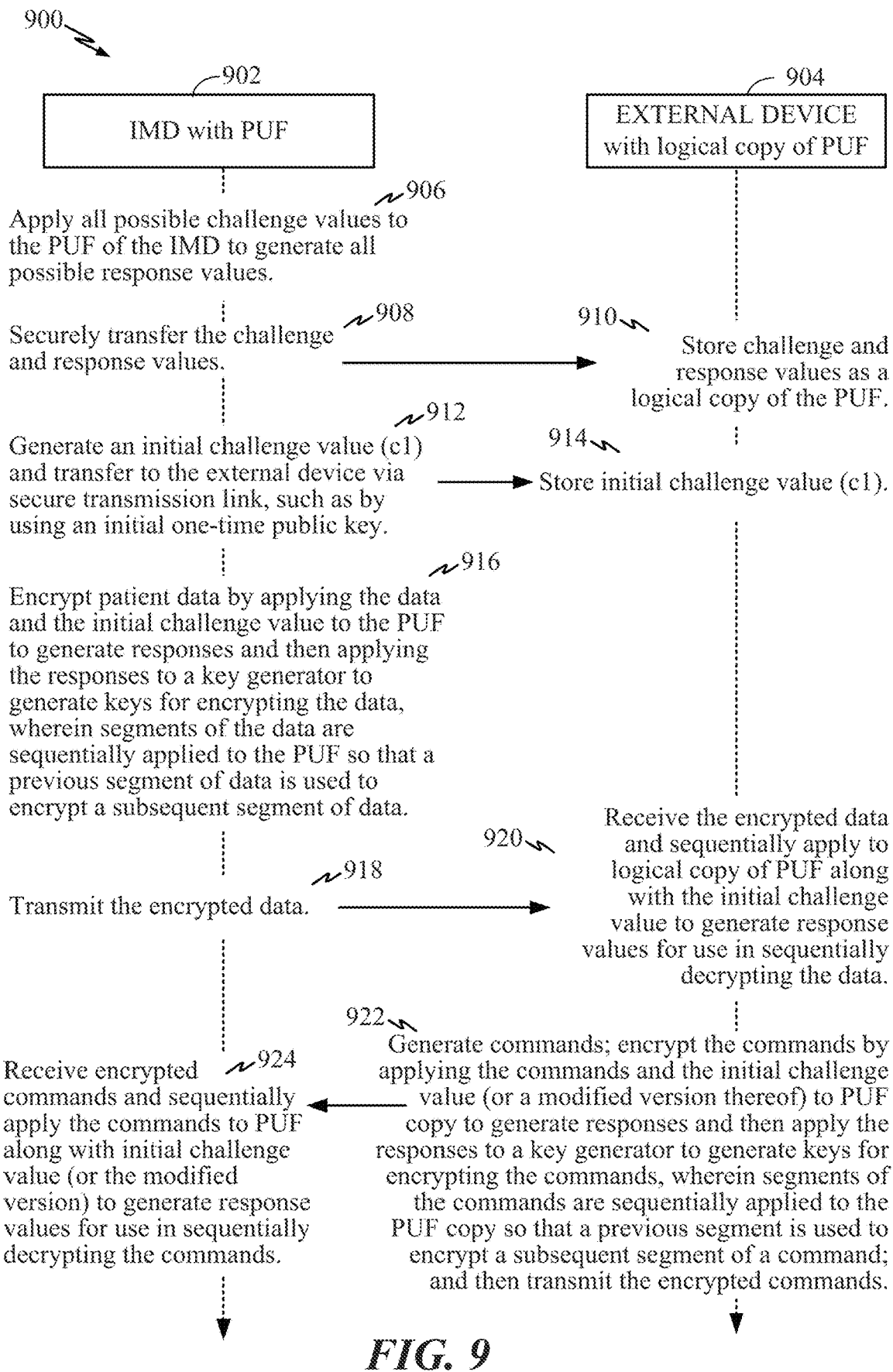
FIG. 9 is a timing diagram summarizing exemplary procedures for secure communications using a PUF and a logical copy of the PUF.

FIG. 9 is a timing diagram 900 that further illustrates the operations of FIG. 9, with operations of the IMD 902 shown on the left and operations of the external device (e.g. a personal heath hub) 904 shown on the right. Briefly, at 906, during the initial enrollment procedure in a secure environment, all possible challenge values are applied to the PUF of the IMD to generate all possible response values. At 908, the challenge values and response values are securely transferred to the external device. At 910, the external device stores the challenge values and response values within internal secure memory as a logical copy of the PUF using lookup tables or the like. At 912, following device implant, an initial challenge value (c1) is generated or otherwise obtained within the IMD and then transferred to the external device via a secure transmission link, such as by using an initial one-time public key of a public key/private key cryptographic procedure as discussed above. At 914, the external device stores the initial challenge value (c1) within its internal secure memory. At 916, the IMD encrypts patient data by applying the data and the initial challenge value to the PUF to generate responses and then applying the responses to a key generator to generate keys for encrypting the data, wherein segments of the data are sequentially applied to the PUF so that a previous segment of data is used to encrypt a subsequent segment of data, using the sequential techniques described above. At 918, the IMD transmits the encrypted data.

At 920, the receives the encrypted data and sequentially applies the encrypted data to logical copy of PUF along with the initial challenge value to generate response values for use in sequentially decrypting the data, again using techniques described above. At 922, the external device: generate commands for controlling the IMD; encrypts the commands by applying the commands and the initial challenge value (or a modified version thereof, as discussed above) to PUF copy to generate responses and then applying the responses to a key generator to generate keys for encrypting the commands, wherein segments of the commands are sequentially applied to the PUF copy so that a previous segment is used to encrypt a subsequent segment of a command; and then transmits the encrypted commands. At 924, the IMD receives the encrypted commands and sequentially applies the commands to PUF along with initial challenge value (or the modified version) to generate response values for use in sequentially decrypting the commands. Thereafter, the IMD processes the commands by, for example, initiating or adjusting therapy or by sensing additional or alternative physiological signals.

Figure 10:
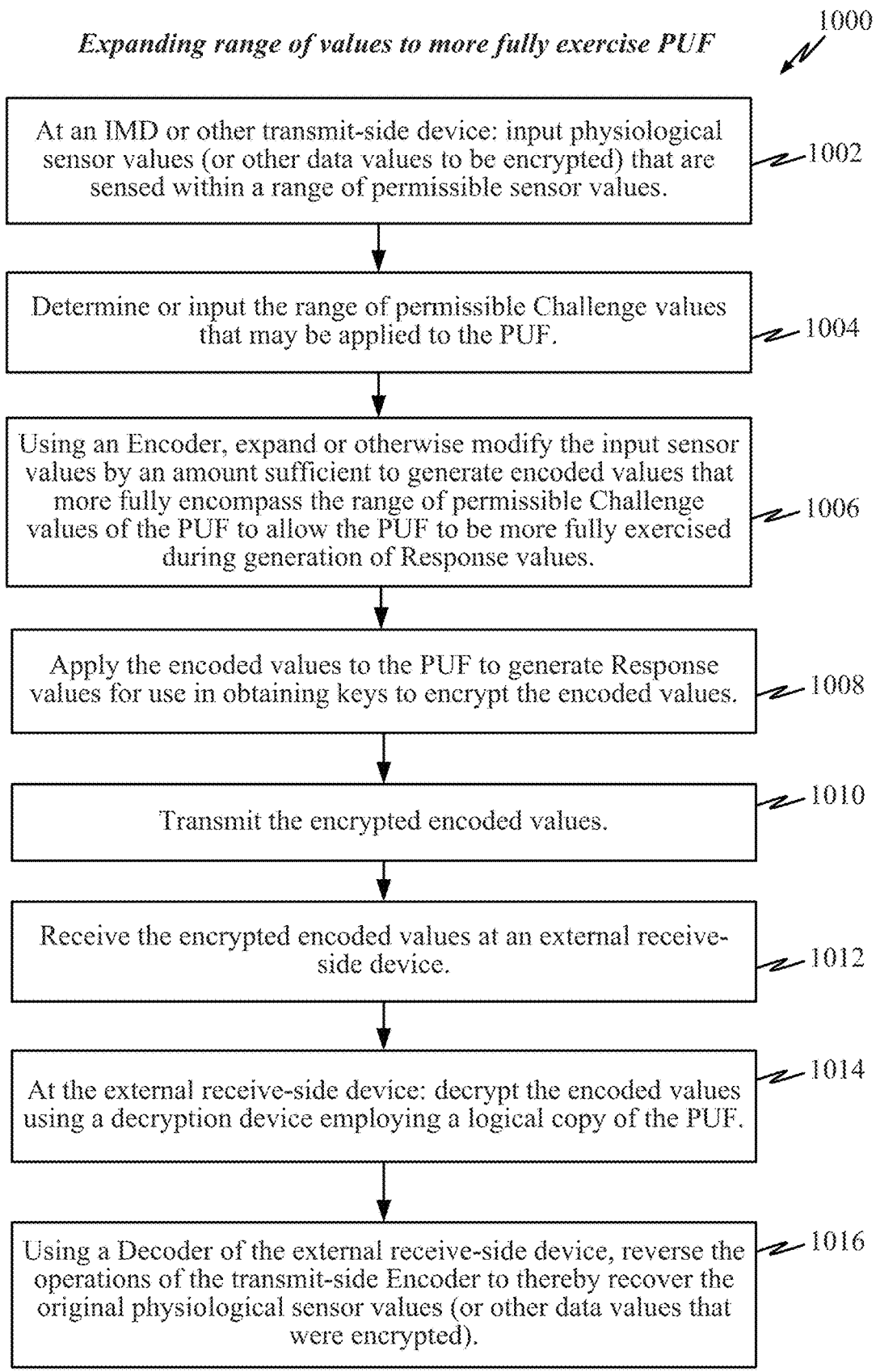
FIG. 10 is a flow diagram summarizing exemplary procedures for secure communications where an encoder modifies values prior to encryption so as to more fully exercise a PUF used during the encryption process.

FIG. 10 summarizes a procedure 1000 for encoding/decoding data to allow the PUF of the transmit-side device (e.g. an IMD) to be more fully exercised so as to improve security. At 1002, the IMD or other transmit-side device inputs physiological sensor values (or other data values to be encrypted) that are sensed within a range of permissible sensor values. For example, the sensor might obtain systolic blood pressure values for a patient within a predetermined permissible range of sensor output values of 0 to 300 mmHG. In practice, however, the systolic blood pressure for a particular patient might be within a fairly narrow range of values of 90-120 mmHG. If these values were directly applied to the PUF as challenge values, the response values from the PUF would be within a fairly narrow range of values as well, and this lack of entropy might allow an eavesdropper to more easily decipher the encrypted data to obtain the encryption or decryption keys. As such, it may be advantageous to expand or otherwise modify the values obtained from the physiological sensor to more fully exercise the PUF (i.e. to cause the PUF to produce response values that are more widely distributed within a larger set of possible response values to thereby improve overall security). Accordingly, at 1004, the IMD determines or inputs the range of permissible challenge values that may be applied to the PUF of the IMD. (This value might be determined in advance during the design of the IMD and stored or otherwise encoded within the IMD.)

At 1006, using an encoder of the IMD, the input sensor values are expanded or otherwise modified by an amount sufficient to generate encoded values that more fully encompass the range of permissible challenge values of the PUF to thereby allow the PUF to be more fully exercised during generation of response values. In one example, the encoder may include lookup tables that map particular sensor values (e.g. blood pressure values) to challenge values that are more widely distributed within the permissible numerical challenge space of the PUF. Different mappings may be provided for use with different sensor readings, which may have different ranges of permissible or practical values. At 1008, the encoded values are applied to the PUF to generate response values for use in obtaining keys to encrypt the encoded values. At 1010, the encrypted encoded values are transmitted for reception, at 1012, by an external receive-side device, such as the aforementioned health hub. At 1014, the external receive-side device decrypts the encoded values using a decryption device employing a logical copy of the PUF. At 1016, a decoder of the external receive-side device is used to reverse the operations of the transmit-side encoder to thereby recover the original physiological sensor values (or other data values that were encrypted). Note that the decoder can be designed or programmed in advance to be capable of reversing operations of the encoder. For example, if the encoder uses lookup tables to map sensor values to challenge values that are more widely distributed within the permissible numerical challenge space of the PUF, the decoder may be provided with those same lookup tables during the initial enrollment procedure.

Figure 11:
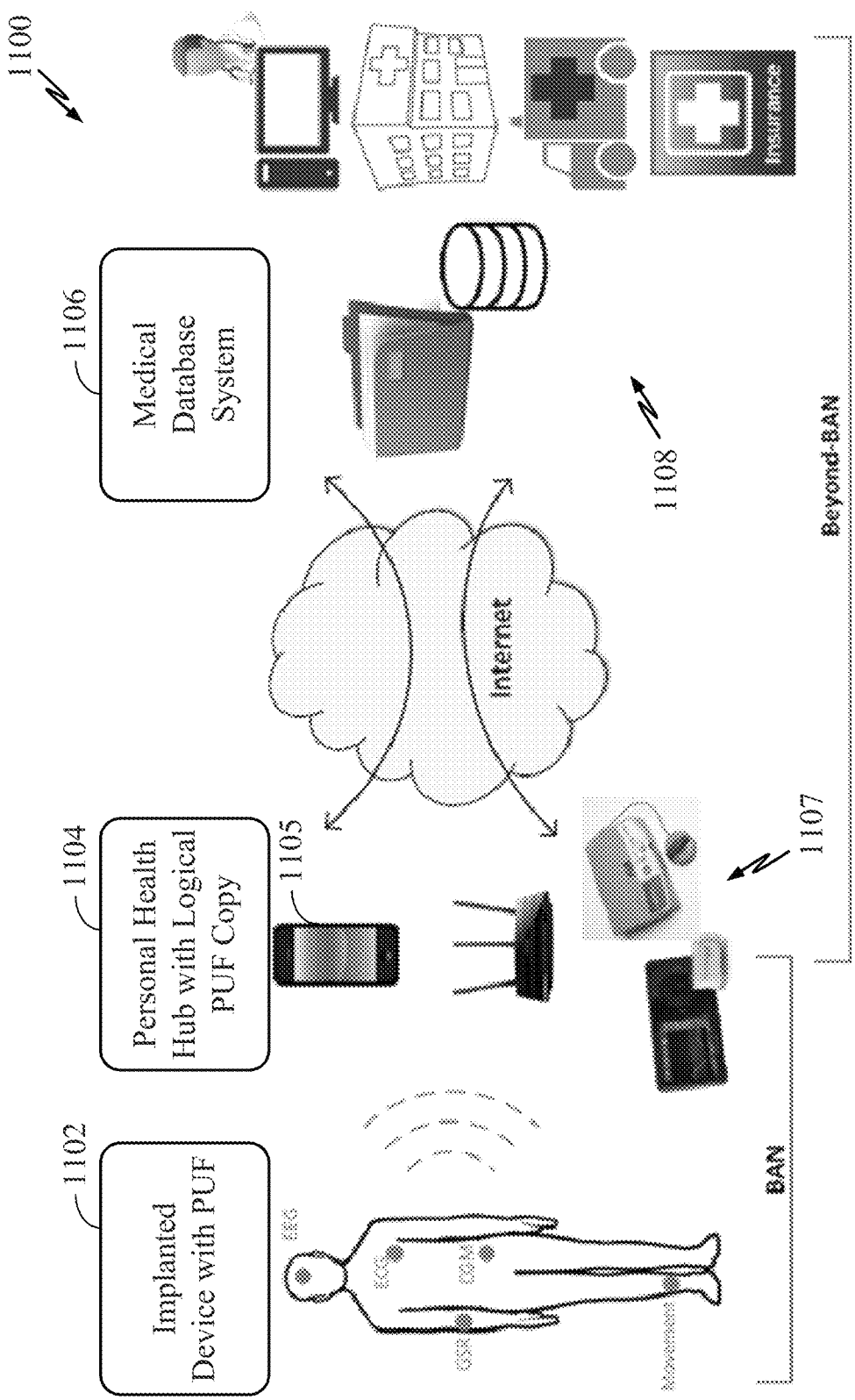
FIG. 11 is a high-level schematic block diagram illustrating an overall medical communication system including a body area network (BAN) having an IMD.

FIG. 11 provides an overview of a system 1100 that may include an IMD (or other device having a PUF) and a personal health hub (or other device having a logical copy of the PUF), as well as other components or systems. Briefly, an implantable device 1102 may be implanted within a patient to sense parameters (or delivery therapy) in one or more of the brain (e.g. sensing of electroencephalogram (EEG) signals), the heart (e.g. sensing of electrocardiogram (ECG) signals), the blood (e.g. continuous glucose monitoring (CGM), the skin (e.g. sensing of galvanic skin response (GSR) in conjunction with an external sensor), and limb movement, etc. A personal health hub 1104 may communicate with the implant device 1002 as part of a wireless body area network (BAN). The personal health hub 1104 may include a smartphone or tablet computer 1105, or other dedicated health devices, collectively identified by reference numeral 1107, such as a bedside health monitor. The personal health hub 1104 may communicate via the Internet or World Wide Web (WWW) with devices outside the BAN such as a centralized medical database system 1106, which in turn may be connected to various clinician/physician systems, insurance systems, emergency systems, etc., collectively identified by reference numeral 1108. The implant device 1102 collects and sends health data to and receives operation commands from the health hub 1104. The health hub 1104 processes health data, sends operational commands to implantable devices, and sends alerts/updates to the medical database 1106. The medical database 1106 stores centralized health data and provides remote access for selected third parties such as clinicians, insurance companies, emergency responders, etc., as shown.

Additional Exemplary Systems and Methods

Figure 12:
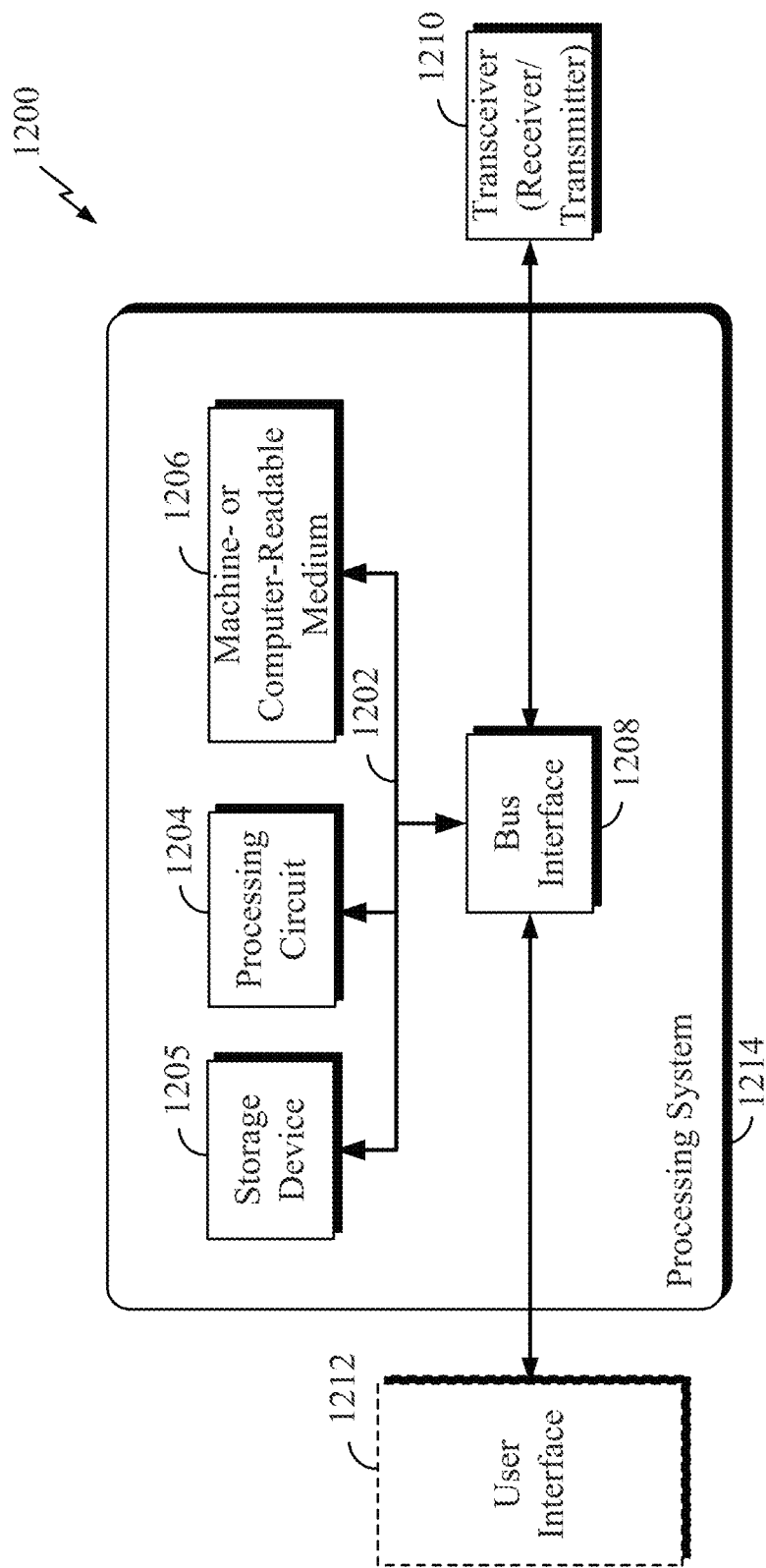
FIG. 12 is a block diagram illustrating an example of a hardware implementation for an apparatus employing a processing system that may exploit the systems, methods and apparatus of FIGS. 1-11.

FIG. 12 illustrates an overall system or apparatus 1200 in which at least some of the systems, methods and apparatus of FIGS. 1-11 may be implemented. In accordance with various aspects of the disclosure, an element, or any portion of an element, or any combination of elements may be implemented with a processing system 1214 that includes one or more processing circuits 1204. For example, apparatus 1200 may be a user equipment (UE) of a mobile communication system where the UE is a smartphone adapted for use a personal heath hub or the apparatus may be an IMD equipped for wireless communication with external devices. If implemented as a smartphone or similar device, the apparatus 1200 may be used with a radio network controller (RNC). Examples of processing circuits 1204 that might be configured to implement processing features described herein include microprocessing circuits, microcontrollers, digital signal processing circuits (DSPs), field programmable gate arrays (FPGAs), programmable logic devices (PLDs), state machines, gated logic, discrete hardware circuits, SoCs, and other suitable hardware configured to perform the various functionality described throughout this disclosure. That is, the processing circuit 1204, as utilized in the apparatus 1200, may be used to implement aspects of any one or more of the processes described above and illustrated in FIGS. 1, 2, 3, 4, 5, 6, 7, 8, 9, 10 and 11 (and those illustrated in FIGS. 12, 13, 14, 15, 16, 17, 18, 19, and 20, discussed below).

In the example of FIG. 12, the processing system 1214 may be implemented with a bus architecture, represented generally by bus 1202. The bus 1202 may include any number of interconnecting buses and bridges depending on the specific application of the processing system 1214 and the overall design constraints. The bus 1202 links various circuits including one or more processing circuits (represented generally by the processing circuit 1204), the storage device 1205, and a machine-readable, processor-readable, processing circuit-readable or computer-readable media (represented generally by a non-transitory machine-readable medium 1206). The bus 1202 may also link various other circuits such as timing sources, peripherals, voltage regulators, and power management circuits, which are well known in the art, and therefore, will not be described any further. The bus interface 1208 provides an interface between bus 1202 and a transceiver 1210. The transceiver 1210 provides a means for communicating with various other apparatus over a transmission medium. Depending upon the nature of the apparatus, a user interface 1212 (e.g., keypad, display, speaker, microphone, joystick) may also be provided but is not required, particularly for IMDs.

The processing circuit 1204 is responsible for managing the bus 1202 and for general processing, including the execution of software stored on the machine-readable medium 1206. The software, when executed by processing circuit 1204, causes processing system 1214 to perform the various functions described herein for any particular apparatus. Machine-readable medium 1206 may also be used for storing data that is manipulated by processing circuit 1204 when executing software.

One or more processing circuits 1204 in the processing system may execute software or software components. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. A processing circuit may perform the tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory or storage contents. Information, arguments, parameters, data, etc. may be passed, forwarded, or transmitted via any suitable means including memory sharing, message passing, token passing, network transmission, etc.

The software may reside on machine-readable medium 1206. The machine-readable medium 1206 may be a non-transitory machine-readable medium or computer-readable medium. A non-transitory processing circuit-readable, machine-readable or computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), RAM, ROM, a programmable ROM (PROM), an erasable PROM (EPROM), an electrically erasable PROM (EEPROM), a register, a removable disk, a hard disk, a CD-ROM and any other suitable medium for storing software and/or instructions that may be accessed and read by a machine or computer. The terms "machine-readable medium", "computer-readable medium", "processing circuit-readable medium" and/or "processor-readable medium" may include, but are not limited to, non-transitory media such as portable or fixed storage devices, optical storage devices, and various other media capable of storing, containing or carrying instruction(s) and/or data. Thus, the various methods described herein may be fully or partially implemented by instructions and/or data that may be stored in a "machine-readable medium," "computer-readable medium," "processing circuit-readable medium" and/or "processor-readable medium" and executed by one or more processing circuits, machines and/or devices. The machine-readable medium may also include, by way of example, a carrier wave, a transmission line, and any other suitable medium for transmitting software and/or instructions that may be accessed and read by a computer.

The machine-readable medium 1206 may reside in the processing system 1214, external to the processing system 1214, or distributed across multiple entities including the processing system 1214. The machine-readable medium 1206 may be embodied in a computer program product. By way of example, a computer program product may include a machine-readable medium in packaging materials. Those skilled in the art will recognize how best to implement the described functionality presented throughout this disclosure depending on the particular application and the overall design constraints imposed on the overall system.

One or more of the components, steps, features, and/or functions illustrated in the figures may be rearranged and/or combined into a single component, block, feature or function or embodied in several components, steps, or functions. Additional elements, components, steps, and/or functions may also be added without departing from the disclosure. The apparatus, devices, and/or components illustrated in the Figures may be configured to perform one or more of the methods, features, or steps described in the Figures. The algorithms described herein may also be efficiently implemented in software and/or embedded in hardware.

The various illustrative logical blocks, modules, circuits, elements, and/or components described in connection with the examples disclosed herein may be implemented or performed with a general purpose processing circuit, a digital signal processing circuit (DSP), an application specific integrated circuit (ASIC), a field programmable gate array (FPGA) or other programmable logic component, discrete gate or transistor logic, discrete hardware components, or any combination thereof designed to perform the functions described herein. A general purpose processing circuit may be a microprocessing circuit, but in the alternative, the processing circuit may be any conventional processing circuit, controller, microcontroller, or state machine. A processing circuit may also be implemented as a combination of computing components, e.g., a combination of a DSP and a microprocessing circuit, a number of microprocessing circuits, one or more microprocessing circuits in conjunction with a DSP core, or any other such configuration.

Hence, in one aspect of the disclosure, processing circuit 1204 illustrated in FIG. 12—or components thereof—may be a specialized processing circuit (e.g., an ASIC)) that is specifically designed and/or hard-wired to perform the algorithms, methods, and/or blocks described in FIGS. 1, 2, 3, 4, 5, 6, 7, 8, 9, 10 and 11 (and those illustrated in FIGS. 12, 13, 14, 15, 16, 17, 18, 19, and 20, discussed below). Thus, such a specialized processing circuit (e.g., ASIC) may be one example of a means for executing the algorithms, methods, and/or blocks described in FIGS. 1, 2, 3, 4, 5, 6, 7, 8, 9, 10 and 11 (and those illustrated in FIGS. 12, 13, 14, 15, 16, 17, 18, 19, and 20, discussed below). The machine-readable storage medium may store instructions that when executed by a specialized processing circuit (e.g., ASIC) causes the specialized processing circuit to perform the algorithms, methods, and/or blocks described herein.

Figure 13:
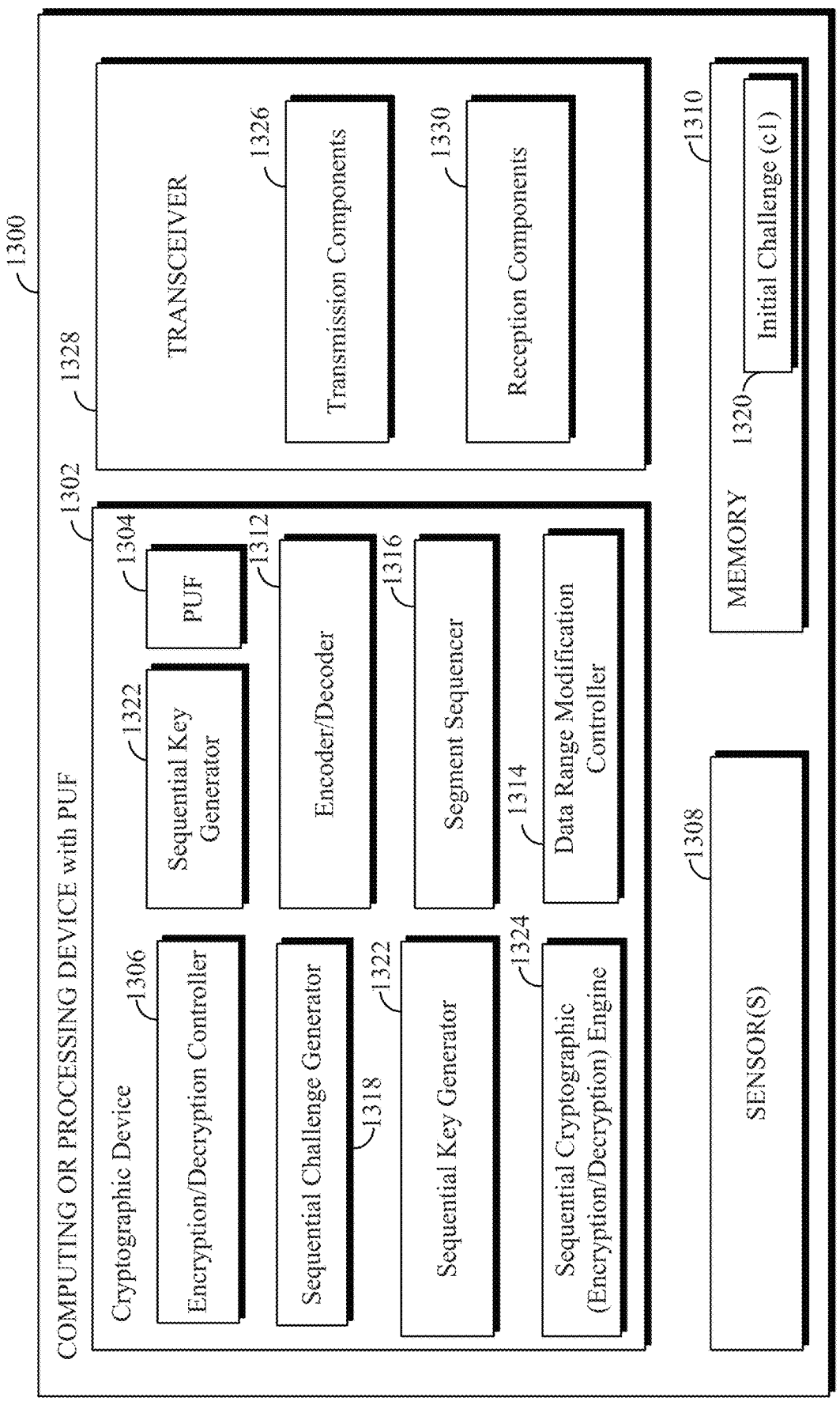
FIG. 13 is a block diagram illustrating exemplary components of a computing and/or processing system equipped with components configured to implement secure communications using a PUF device.

FIG. 13 illustrates selected and exemplary components of a computing or processing system 1300 having a cryptographic device 1302 that uses a PUF 1304 for encryption and decryption or other cryptographic operations. For encryption operations, an encryption/decryption controller 1306 applies data obtained from one or more sensors 1308 (or from other sources such as memory 1310) to an encoder/decoder 1312 that encodes the data. As part of the encoding operation, the data may be expanded or modified using a data range modification controller 1314 to more fully exercise the PUF 1304 (using techniques discussed above in connection with FIG. 10). The encoded data is divided into N-bit segments by a segment sequencer 1316 (which may include a series of flip-flops, as described above) and converted to a sequential series of challenge values by a sequential challenge generator 1318 for sequentially applying to the PUF to obtain response values (using segmented sequential techniques discussed above, e.g., in connection with FIG. 3). As already explained, an initial challenge value may be employed. The value may be obtained from memory 1310 where it is stored as challenge value (c1) 1320. Responses obtained from the PUF to the challenge values are fed into a sequential key generator 1322 to generate a sequence of keys that are then applied to a sequential cryptographic (encryption/decryption) engine 1324, which encrypts the message data, as discussed above. The encrypted message data is transmitted under the control of transmission components 1326 of a transceiver 1328, which also includes reception components 1330.

For decryption operations, encrypted data is received from a separate device by the reception components 1330 and decrypted using the reverse of the operations just summarized. These operations were generally described above with reference to FIG. 4. However, for the purposes of FIG. 13, the PUF 1304 is used during decryption rather than a copy of the PUF as shown in FIG. 4. Briefly, the encryption/decryption controller 1306 operates in conjunction with components such as the sequential challenge generator 1318 and the segment sequencer 1316 to apply the received encrypted data to the PUF 1304 to obtain response values that are used to generate decryption keys using key generator 1322, which are applied to the encryption/decryption engine 1342 to decrypt the data. The decrypted data is further applied to the encoder/decoder 1312, which operates in conjunction with the data range modification controller 1314 (if needed), to decode the data, which may include commands or other messages for controlling the operation of the device 1300 and/or may include data for storing in memory 1310.

Thus, in at least some examples, the computing or processing device 1300 includes components operative to: apply a message to the PUF device to obtain a response value; obtain a cryptographic key from the response value; and perform a cryptographic operation on the message using the cryptographic key, where the cryptographic operation may be encryption, decryption or some other cryptographic operation. In some examples, the computing or processing device 1300 includes components operative to: sequentially apply segments of a message to the PUF device 1304 to obtain a series of corresponding response values; obtain a series of corresponding encryption keys from the series of response values for encrypting portions of the message; and encrypt the message by sequentially encrypting segments of the message using the series of corresponding encryption keys. The computing or processing device 1300 is further operative to sequentially apply segments of the message to the PUF device 1300 to obtain a series of corresponding response values by: extracting the bits of the segment of the message for each segment of the message; and applying the bits of the segment of the message to the PUF device to obtain a response value of the series of corresponding response values.

For a first segment of the message, the processor 1300 is operative to apply the bits of the segment of the message to the PUF device 1304 along with a predetermined challenge value (c1) to obtain a first response value of the series of response values. The encryption key (of the series of corresponding encryption keys) is applied by components of the computing device 1300 to the cryptographic engine 1324 along with the same or a different segment of the message so that, for example, a previous segment of the message is used to encrypt a subsequent segment of the message. The segments of the message may be applied to an encoder/decoder 1312 to expand a range of values of the message to a wider range of values based on a range of values associated with the PUF device 1304. Note also that the segments of the message may be sequentially applied to the PUF device 1304 to obtain a series of corresponding response values using, for example, a series of non-volatile flip-flop devices (as shown in FIG. 3). The encrypted message segments are sequentially transmitted using transceiver 1328 to a separate device equipped with a logical copy of the PUF (such as the device of FIG. 14, discussed next).

Note that the various components of FIG. 13 may be replaced with a suitable means for performing or controlling corresponding operations. Hence, in at least some examples, a device or apparatus includes: means for applying a message to the PUF device to obtain a response value; means for obtaining a cryptographic key from the response value; and means for performing a cryptographic operation on the message using the cryptographic key. In some examples, the device or apparatus includes: means for sequentially applying segments of a message to the PUF device to obtain a series of corresponding response values; means for obtaining a series of corresponding encryption keys from the series of response values for encrypting portions of the message; and means for encrypting the message by sequentially encrypting segments of the message using the series of corresponding encryption keys.

Additionally or alternatively, the device includes: means for applying messages sequentially to the PUF device to obtain corresponding response values; means for obtaining corresponding cryptographic keys from the response values; and means for performing cryptographic operations on the segments of the message using the corresponding cryptographic keys. The means for applying segments of the message sequentially to the PUF device to obtain the corresponding response values may include: means for obtaining bits of a segment of the message for each segment of the message; and means for applying the bits of the segment of the message to the PUF device to obtain a particular response value of a series of corresponding response values. Means may be provided for applying a predetermined challenge value to the PUF device to obtain a first response value of the series of response values. The means for obtaining the corresponding cryptographic keys from the response values may include means for applying a corresponding response value for each segment of the message to a key generator to obtain the corresponding cryptographic key. The means for performing the cryptographic operation on segments of the message using the corresponding cryptographic keys may include means for applying a cryptographic key of a series of cryptographic keys to a cryptographic engine along with the same or a different segment of the message to obtain an encrypted or decrypted value. The means for applying the cryptographic key of the series of corresponding cryptographic keys to the cryptographic engine is performed so that a previous segment of the message encrypts or decrypts a subsequent segment of the message.

Means may be provided for applying the segments of the message to an encoder or decoder prior to applying the segments to the PUF device to modify a range of values of the segments of the message to more fully exercise the PUF device. The cryptographic operation may be decryption or encryption. Wherein the cryptographic operation is decryption, means may be provided for initially obtaining a message to be decrypted that had been encrypted using a logical copy of the PUF device. Wherein the cryptographic operation is encryption, means may be provided for subsequently sending an encrypted message to a device equipped with the logical copy of the PUF device. Still further, in other examples, means are provided for sequentially applying segments of an encrypted message to a PUF wherein a logical copy of the PUF had been previously used to encrypt the message to obtain a series of corresponding response values; means are provided for obtaining a series of corresponding decryption keys from the series of response values for decrypting portions of the message; and means are provided for decrypting the encrypted message by sequentially decrypting segments of the message using the series of corresponding decryption keys.

Still further, the means for sequentially applying segments of the message to the PUF device to obtain a series of corresponding response values may include: means for extracting the bits of the segment of the message for each segment of the message; and means for applying the bits of the segment of the message to the PUF device to obtain a response value of the series of corresponding response values. For processing a first segment of the message, the device may include means for applying the bits of the segment of the message to the PUF device along with a predetermined challenge value to obtain a first response value of the series of response values.

To obtain the series of corresponding encryption keys from the series of response values for encrypting portions of the message, the device may include means for applying the corresponding response value to a key generator to obtain an encryption key of the series of corresponding encryption keys for each segment of the message. To encrypt the message by sequentially encrypting segments of the message using the series of corresponding encryption keys, the device may include: means for applying the encryption key of the series of corresponding encryption keys to an encryption engine along with the same or a different segment of the message to obtain an encrypted value, for each segment of the message. Still further, the device may include means for applying the encryption key of the series of corresponding encryption keys to an encryption engine along with the same or a different segment of the message so that, for example, a previous segment of the message is used to encrypt a subsequent segment of the message. The device may also include means for applying the segments of the message to an encoder to expand a range of values of the message to a wider range of values associated with the PUF device. The device may still further include means for sequentially transmit the encrypted message segments to a device equipped with a logical copy of the PUF device.

Still further the various components of FIG. 13 may be represented, in some examples, as a set of instructions for controlling a programmable device to perform the corresponding operations. Hence, in at least some examples, instruction are provide that include: instructions for applying a message to a PUF device to obtain a response value; instructions for obtaining a cryptographic key from the response value; and instructions for performing a cryptographic operation on the message using the cryptographic key.

Figure 14:
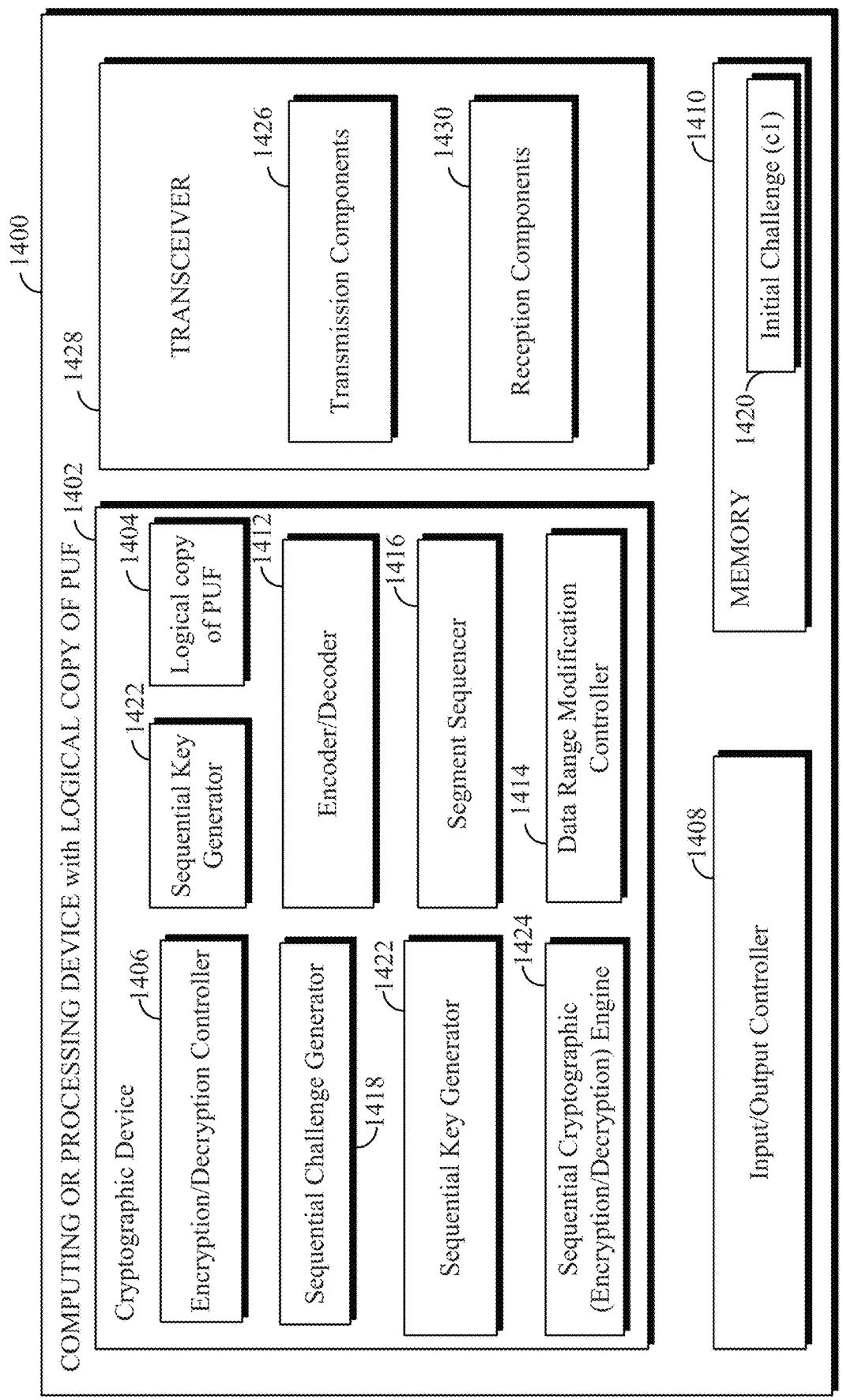
FIG. 14 is a block diagram illustrating exemplary components of a computing and/or processing system equipped with components configured to implement secure communications using a logical copy of a PUF device.

FIG. 14 illustrates selected and exemplary components of a computing or processing system 1400 having a cryptographic device 1402 that uses a logical copy of a PUF 1404 for encryption and decryption or other cryptographic operations. Many of the components of FIG. 13 and similar to those of FIG. 13 but operate using the logical copy of a PUF rather than a PUF and hence will be summarized only briefly. The decryption operations of the components of FIG. 14 may be the reverse of the encryption operations of the components of FIG. 13 (with the device of FIG. 14 using the logical copy of the PUF 1404 to decrypt messages sent from the device of FIG. 13). Likewise, the encryption operations of the components of FIG. 14 may be the reverse of the decryption operations of the components of FIG. 13 (with the device of FIG. 14 using the logical copy of the PUF 1404 to encrypt messages to be sent to the device of FIG. 13).

For encryption operations, an encryption/decryption controller 1406 applies data or commands obtained from an input/output controller 1408 (or from other sources such as memory 1410) to an encoder/decoder 1412 that encodes the data. The data/commands may be expanded or modified using a range modification controller 1414 to more fully exercise the logical copy of PUF 1404. The encoded data/commands are divided into segments by a segment sequencer 1416 and converted to a sequential series of challenge values by a sequential challenge generator 1418 for sequentially applying to the logical copy of the PUF to obtain response values. As already explained, an initial challenge value may be employed. The value may be obtained from memory 1410 where it is stored as challenge value (c1) 1420. The challenge value is shared with the device of FIG. 13 in advance using secure communications (as already explained). Responses obtained from the logical copy of the PUF to the challenge values are fed into a sequential key generator 1422 to generate a sequence of keys that are then applied to a sequential cryptographic (encryption/decryption) engine 1424, which encrypts the data/commands, as discussed above. The encrypted data/commands are transmitted under the control of transmission components 1426 of a transceiver 1428, which also includes reception components 1430.

For decryption operations, encrypted data is received from the separate device of FIG. 13 by the reception components 1430 and decrypted using the reverse of the operations just summarized. These operations were described above with reference to FIG. 4. Briefly, the encryption/decryption controller 1406 operates in conjunction with components such as the sequential challenge generator 1418 and the segment sequencer 1416 to apply the encrypted data to the logical copy of the PUF 1404 to obtain response values that are used to generate decryption keys using key generator 1422, which are applied to the encryption/decryption engine 1442 to decrypt the data. The decrypted data is further applied to the encoder/decoder 1412, which operates in conjunction with the data range modification controller 1414 (if needed), to decode the data, which may include sensor data received from the device 1300 of FIG. 13.

Thus, in at least some examples, the computing or processing device 1400 includes components operative to: sequentially apply segments of an encrypted message to the logical copy 1404 of a PUF device previously used to encrypt the message to obtain a series of corresponding response values; obtain a series of corresponding decryption keys from the series of response values for decrypting portions of the message; and decrypt the encrypted message by sequentially decrypting segments of the message using the series of corresponding decryption keys. The computing or processing device 1400 is further operative to sequentially apply segments of the message to the logical copy of the PUF to obtain a series of corresponding response values by: extracting the bits of the segment of the message for each segment of the message; and applying the bits of the segment of the message to the logical copy of the PUF device to obtain a response value of the series of corresponding response values.

For a first segment of the message, the processor 1400 is operative to apply the bits of the segment of the message to the logical copy of the PUF along with a predetermined challenge value (c1) to obtain a first response value of the series of response values. The encryption key (of the series of corresponding encryption keys) is applied by components of the computing device 1400 to the cryptographic engine 1424 along with the same or a different segment of the message so that a previous segment of the message is used to encrypt a subsequent segment of the message. The segments of the message may be applied to an encoder/decoder 1412 to expand a range of values of the message to a wider range of values based on a range of values associated with the logical copy of the PUF. Note also that the segments of the message may be sequentially applied to the logical copy of the PUF to obtain a series of corresponding response values. The encrypted message segments are sequentially transmitted using transceiver 1428 to a separate device equipped with the PUF (such as the device of FIG. 13, discussed above).

The various components of FIG. 14 may be replaced with a suitable means for performing or controlling corresponding operations. Hence, in at least some examples, a device or apparatus includes: means for applying a message to a logical copy of a PUF device to obtain a response value; means for obtaining a cryptographic key from the response value; and means for performing a cryptographic operation on the message using the cryptographic key. Additionally or alternatively, the device includes: means for sequentially applying segments of an encrypted message to a logical copy of a PUF device previously used to encrypt the message to obtain a series of corresponding response values; means for obtaining a series of corresponding decryption keys from the series of response values for decrypting portions of the message; and means for decrypting the encrypted message by sequentially decrypting segments of the message using the series of corresponding decryption keys.

Still further, means may be provided for sequentially applying segments of the message to the logical copy of the PUF device to obtain corresponding response values. Means may be provided for obtaining corresponding cryptographic keys from the response values. Means may be provided for performing the cryptographic operation on the segments of the message using the corresponding cryptographic keys. The means for applying the segments of the message sequentially to the logical copy of the PUF device to obtain the corresponding response values may include: means for obtaining bits of a segment of the message for each segment of the message; and means for applying the bits of the segment of the message to the logical copy of the PUF device to obtain a particular response value of a series of corresponding response values. Still further, means may be provided for applying a predetermined challenge value to the logical copy of the PUF device to obtain a first response value of the series of response values.

The means for performing the cryptographic operation on segments of the message using the corresponding cryptographic keys may include means for applying a cryptographic key of a series of cryptographic keys to a cryptographic engine along with the same or a different segment of the message to obtain an encrypted or decrypted value. The means for applying the cryptographic key of the series of corresponding cryptographic keys to the cryptographic engine may operate so that a previous segment of the message encrypts or decrypts a subsequent segment of the message. The cryptographic operation may be, e.g., decryption or encryption. Where the cryptographic operation is decryption, means may be provided for initially obtaining a message to be decrypted that had been encrypted using the PUF device. Wherein the cryptographic operation is encryption, means may be provided for subsequently sending an encrypted message to a device equipped with the PUF device.

Still further, the means for sequentially applying segments of the message to the logical copy of the PUF to obtain a series of corresponding response values may include: means for extracting the bits of the segment of the message for each segment of the message; and means for applying the bits of the segment of the message to the logical copy of the PUF to obtain a response value of the series of corresponding response values. For processing a first segment of the message, the device may include means for applying the bits of the segment of the message to the logical copy of the PUF along with a predetermined challenge value to obtain a first response value of the series of response values.

To obtain the series of corresponding encryption keys from the series of response values for encrypting portions of the message, the device may include means for applying the corresponding response value to a key generator to obtain an encryption key of the series of corresponding encryption keys for each segment of the message. To encrypt the message by sequentially encrypting segments of the message using the series of corresponding encryption keys, the device may include: means for applying the encryption key of the series of corresponding encryption keys to an encryption engine along with the same or a different segment of the message to obtain an encrypted value for each segment of the message. Still further, the device may include means for applying the encryption key of the series of corresponding encryption keys to an encryption engine along with the same or a different segment of the message so that, for example, a previous segment of the message is used to encrypt a subsequent segment of the message. The device may also include means for applying the segments of the message to an encoder to expand a range of values of the message to a wider range of values associated with the logical copy of the PUF. The device may still further include means for sequentially transmit the encrypted message segments to a device equipped with the PUF device.

Still further the various components of FIG. 14 may be represented, in some examples, as a set of instructions for controlling a programmable device to perform the corresponding operations. Hence, in at least some examples, instruction are provide that include: instructions for applying a message to a logical copy of a PUF device to obtain a response value; instructions for obtaining a cryptographic key from the response value; and instructions for performing a cryptographic operation on the message using the cryptographic key.

FIG. 15 broadly illustrates and summarizes methods or procedures 1500 that may be performed by suitably equipped processing devices or components. In particular, FIG. 15 illustrates exemplary operations for use for use in or by a computing device having a PUF. Briefly, at 1502, the device applies a message to the PUF device to obtain a response value. At 1504, the device obtains a cryptographic key from the response value. At 1506, the device performs a cryptographic operation on the message using the cryptographic key. Examples of the procedures are described in detail above.

Figure 16:
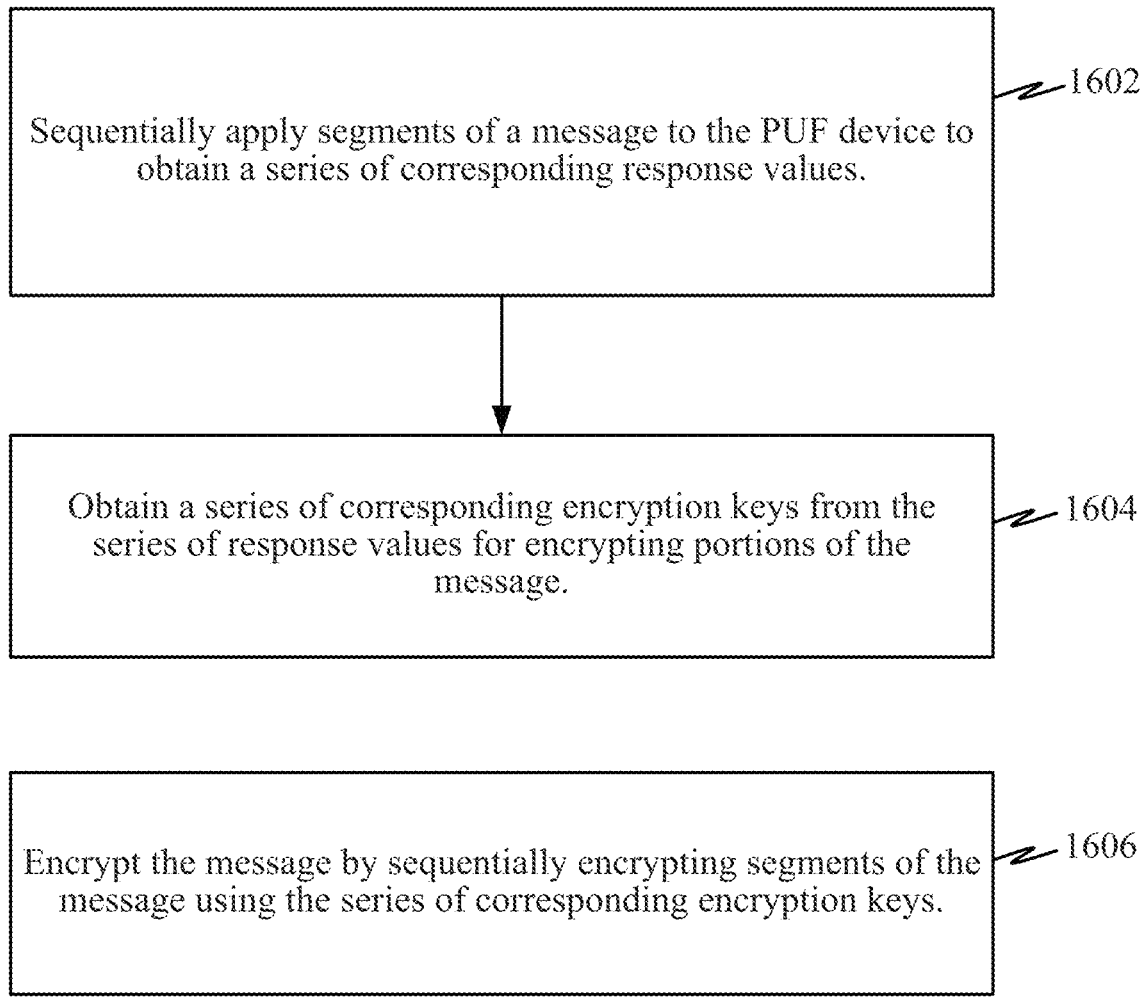
FIG. 16 summarizes exemplary encryption procedures for use by an apparatus or device having a PUF.

FIG. 16 broadly illustrates and summarizes methods or procedures 1600 that may be performed for encrypting messages for use for use in or by a computing device having a PUF. Briefly, at 1602, the device sequentially applies segments of a message to the PUF device to obtain a series of corresponding response values. At 1604, the device obtains a series of corresponding encryption keys from the series of response values for encrypting portions of the message. At 1606, the device encrypts the message by sequentially encrypting segments of the message using the series of corresponding encryption keys.

Figure 17:
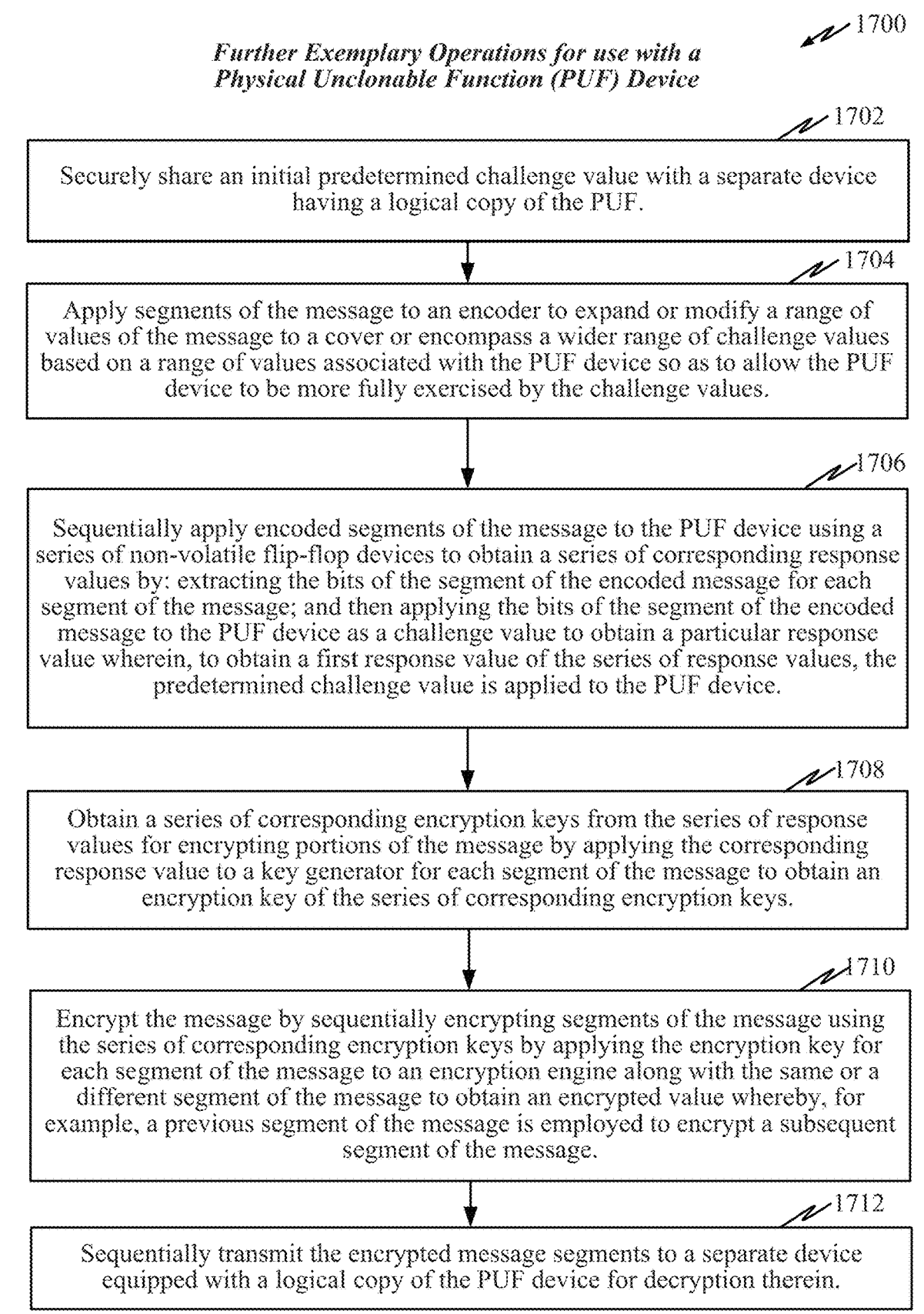
FIG. 17 further illustrates exemplary procedures for use by an apparatus or device having a PUF for encryption.

FIG. 17 further illustrates and summarizes methods or procedures 1700 that may be performed by suitably equipped computing devices or components in conjunction with a PUF to encrypt messages. At 1702, an initial predetermined challenge value is securely shared with a separate device having a logical copy of the PUF. At 1704, segments of the message to be encrypted are applied to an encoder to expand or modify a range of values of the message to a cover or encompass a wider range of challenge values based on a range of values associated with the PUF device so as to allow the PUF device to be more fully exercised by the challenge values. At 1706, encoded segments of the message are sequentially applied to the PUF device using, e.g., a series of non-volatile flip-flop devices to obtain a series of corresponding response values by: extracting the bits of the segment of the encoded message for each segment of the message; and then applying the bits of the segment of the encoded message to the PUF device as a challenge value to obtain a particular response value wherein, to obtain a first response value of the series of response values, the predetermined challenge value is applied to the PUF device. At 1708, a series of corresponding encryption keys are obtained from the series of response values for encrypting portions of the message by applying the corresponding response value to a key generator for each segment of the message to obtain an encryption key of the series of corresponding encryption keys. At 1710, the message is encrypted by sequentially encrypting segments of the message using the series of corresponding encryption keys by applying the encryption key for each segment of the message to an encryption engine along with the same or a different segment of the message to obtain an encrypted value so that, for example, a previous segment of the message may be employed to encrypt a subsequent segment of the message. At 1712, the encrypted message segments are sequentially transmitted to a separate device equipped with a logical copy of the PUF device for decryption and processing therein.

Figure 18:
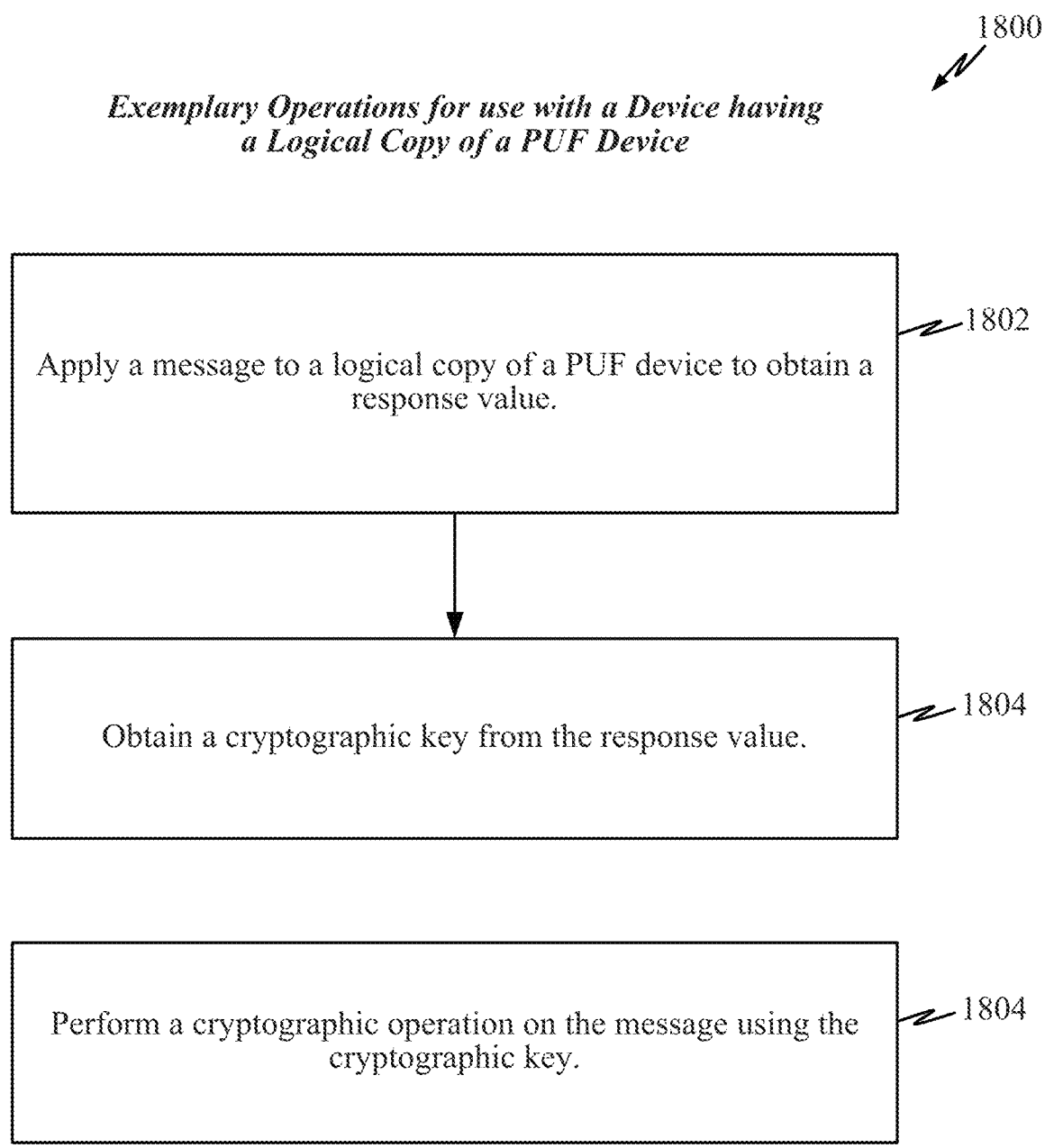
FIG. 18 summarizes exemplary procedures for use by an apparatus or device having a logical copy of a PUF, which may include encryption, decryption or other cryptographic operations.

FIG. 18 broadly illustrates and summarizes methods or procedures 1800 that may be performed by suitably equipped processing devices or components. In particular, FIG. 18 illustrates exemplary operations for use for use in a computing device having a logical copy of a PUF (where the actual PUF may be a component of a separate device). Briefly, at 1802, the device applies a message to a logical copy of a PUF device to obtain a response value. At 1804, the device obtains a cryptographic key from the response value. At 1804, the device performs a cryptographic operation on the message using the cryptographic key. Examples of the procedures are described in detail above.

Figure 19:
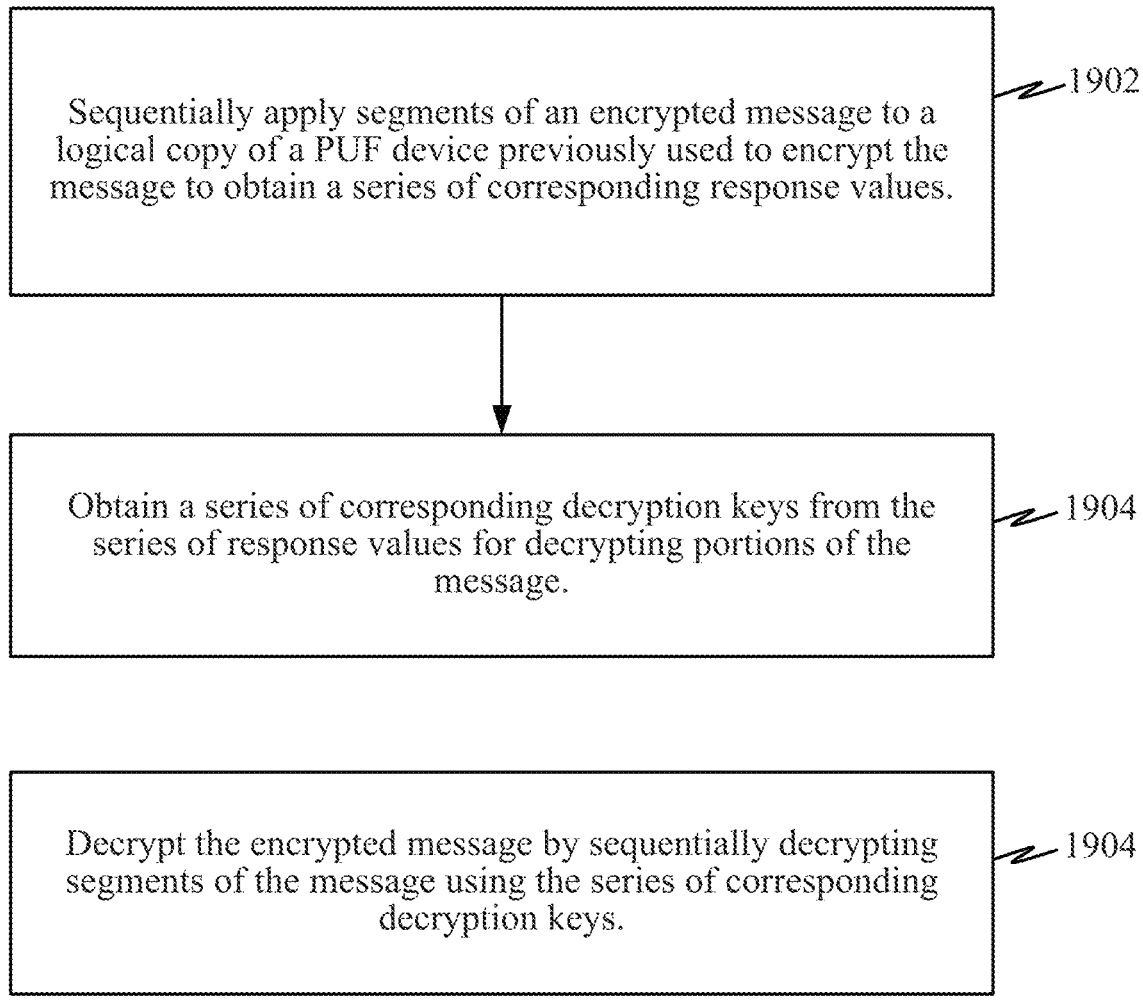
FIG. 19 summarizes exemplary procedures for use by an apparatus or device having a logical copy of a PUF for decryption.

FIG. 19 broadly illustrates and summarizes methods or procedures 1900 that may be performed by suitably equipped processing devices or components for decrypting messages. In particular, FIG. 19 illustrates exemplary operations for use for use in a computing device having a logical copy of a PUF (where the actual PUF was used by another device to encrypt the message). Briefly, at 1902, the device sequentially applies segments of an encrypted message to a logical copy of a PUF device previously used to encrypt the message to obtain a series of corresponding response values. At 1904, the device obtains a series of corresponding decryption keys from the series of response values for decrypting portions of the message. At 1906, the device decrypts the encrypted message by sequentially decrypting segments of the message using the series of corresponding decryption keys.

Figure 20:
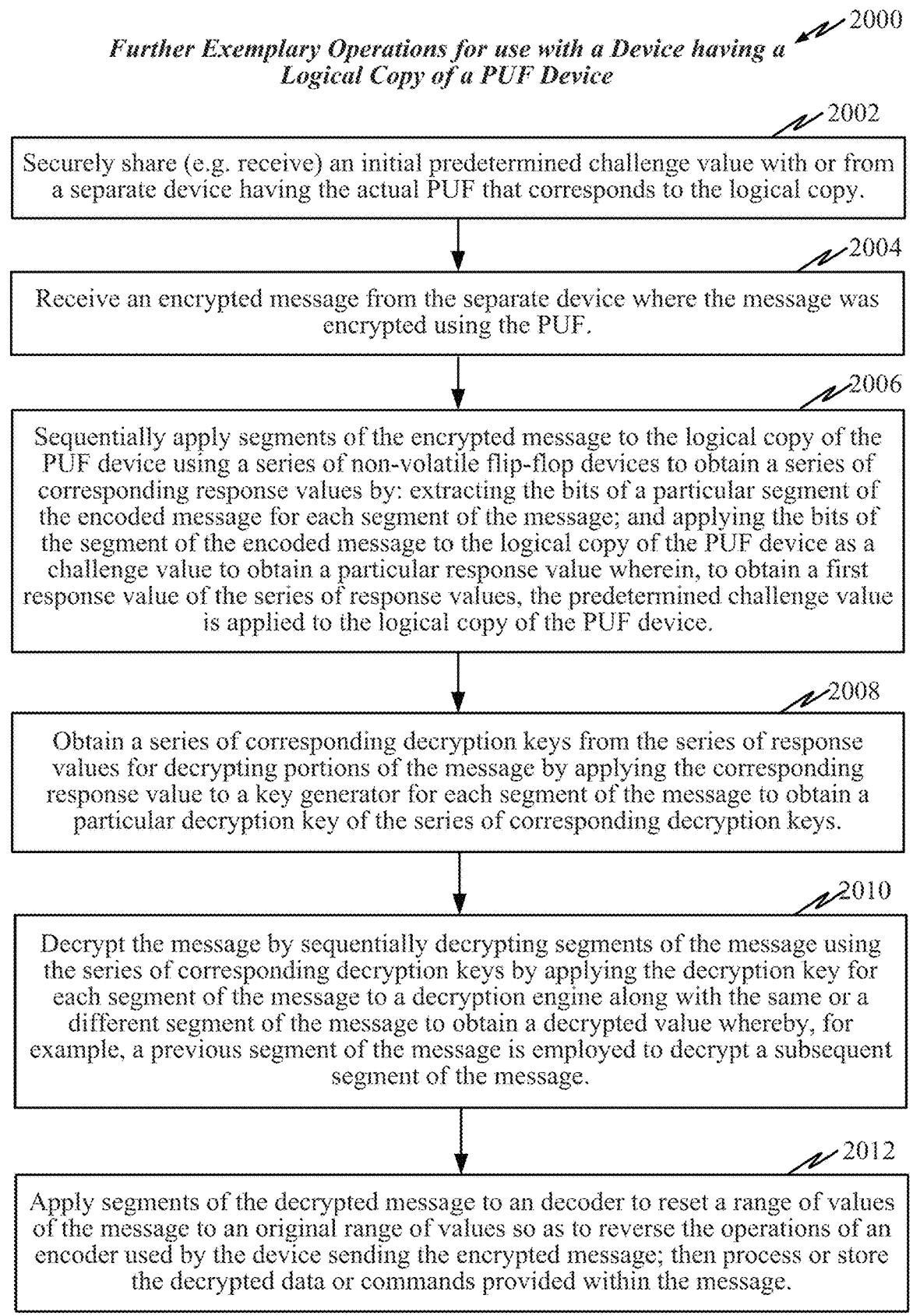
FIG. 20 further illustrates exemplary procedures for use by an apparatus or device having a logical copy of a PUF for decryption.

FIG. 20 further illustrates and summarizes methods or procedures 2000 that may be performed by suitably equipped computing devices or components in conjunction with a logical copy of a PUF to decrypt messages. At 2002, the device securely shares (e.g. receives in a secure manner) an initial predetermined challenge value with (or from) a separate device having the actual PUF that corresponds to the logical copy. At 2004, an encrypted message is received from the separate device where the message was encrypted using the PUF. At 2006, segments of the encrypted message are sequentially applied to the logical copy of the PUF device using, for example, a series of non-volatile flip-flop devices to obtain a series of corresponding response values by: extracting the bits of a particular segment of the encoded message for each segment of the message; and applying the bits of the segment of the encoded message to the logical copy of the PUF device as a challenge value to obtain a particular response value wherein, to obtain a first response value of the series of response values, the predetermined challenge value is applied to the logical copy of the PUF device. At 2008, a series of corresponding decryption keys are obtained from the series of response values for decrypting portions of the message by applying the corresponding response value to a key generator for each segment of the message to obtain a particular decryption key of the series of corresponding decryption keys. At 2010, the message is decrypted by sequentially decrypting segments of the message using the series of corresponding decryption keys by applying the decryption key for each segment of the message to a decryption engine along with the same or a different segment of the message to obtain a decrypted value so that, for example, a previous segment of the message may be employed to decrypt a subsequent segment of the message. At 2012, segments of the decrypted message are applied to a decoder to reset a range of values of the message to an original range of values so as to reverse the operations of an encoder used by the device sending the encrypted message, then the decrypted data or commands provided within the message are processed or stored.

Note that, herein, the terms "obtain" or "obtaining" broadly cover, e.g., calculating, computing, generating, acquiring, receiving, retrieving, inputting or performing any other suitable corresponding actions. Note also that the aspects of the present disclosure may be described herein as a process that is depicted as a flowchart, a flow diagram, a structure diagram, or a block diagram. Although a flowchart may describe the operations as a sequential process, many of the operations can be performed in parallel or concurrently. In addition, the order of the operations may be rearranged. A process is terminated when its operations are completed. A process may correspond to a method, a function, a procedure, a subroutine, a subprogram, etc. When a process corresponds to a function, its termination corresponds to a return of the function to the calling function or the main function.

Those of skill in the art would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

The various features described herein can be implemented in different systems without departing from the aspects disclosed. It should be noted that the foregoing embodiments are merely examples and are not to be construed as limiting. The description of the embodiments is intended to be illustrative, and not to limit the scope of the claims. As such, the present teachings can be readily applied to other types of apparatuses and many alternatives, modifications, and variations will be apparent to those skilled in the art.

Moreover, in the following description and claims the terms "coupled" and "connected," along with their derivatives, may be used. It should be understood that these terms are not intended as synonyms for each other. Rather, in particular aspects, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An aspect is an implementation or example. Reference in the specification to "an aspect," "one aspect," "some aspects," "various aspects," or "other aspects" means that a particular feature, structure, or characteristic described in connection with the aspects is included in at least some aspects, but not necessarily all aspects, of the present techniques. The various appearances of "an aspect," "one aspect," or "some aspects" are not necessarily all referring to the same aspects. Elements or aspects from an aspect can be combined with elements or aspects of another aspect.

Not all components, features, structures, characteristics, etc. described and illustrated herein need be included in a particular aspect or aspects. If the specification states a component, feature, structure, or characteristic "may," "might," "can" or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

In each figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be noted that, although some aspects have been described in reference to particular implementations, other implementations are possible according to some aspects. Additionally, the arrangement and/or order of circuit elements or other features illustrated in the drawings and/or described herein need not be arranged as illustrated and described. Many other arrangements are possible according to some aspects.

What is claimed is:

1. A method for use with a physical unclonable function (PUF) device, the method comprising:
   obtaining a message and, before applying the message to the PUF device, modifying the message based on a range of challenge values that depends on a physical configuration of the PUF device;
   applying the modified message to the PUF device to obtain a response value;
   obtaining a cryptographic key from the response value; and
   performing a cryptographic operation on the modified message using the cryptographic key.

2. The method of claim 1, wherein segments of the modified message are applied sequentially to the PUF device to obtain corresponding response values, corresponding cryptographic keys are obtained from the response values, and the cryptographic operation is then performed on the segments of the modified message using the corresponding cryptographic keys.

3. The method of claim 2, wherein the segments of the modified message are applied sequentially to the PUF device to obtain the corresponding response values by:
   obtaining bits of a segment of the modified message for each segment of the modified message; and
   applying the bits of the segment of the modified message to the PUF device to obtain a particular response value of a series of corresponding response values.

4. The method of claim 2, wherein performing the cryptographic operation on segments of the modified message using the corresponding cryptographic keys includes applying a cryptographic key of a series of cryptographic keys to a cryptographic engine along with the same or a different segment of the modified message to obtain an encrypted or decrypted value.

5. The method of claim 4, wherein the cryptographic key of the series of corresponding cryptographic keys is applied to the cryptographic engine and a previous segment of the modified message encrypts or decrypts a subsequent segment of the modified message.

6. The method of claim 1, wherein the cryptographic operation is decryption or encryption.

7. The method of claim 6, further comprising:
   wherein the cryptographic operation is decryption, initially obtaining a message to be decrypted that had been encrypted using a logical copy of the PUF device; or
   wherein the cryptographic operation is encryption, subsequently sending an encrypted message to a device equipped with the logical copy of the PUF device.

8. The method of claim 1, wherein the physical configuration of the PUF device corresponds to a range of predetermined permissible challenge values, and wherein modifying the message is performed to modify the message based on the range of predetermined permissible challenge values of the PUF device.

9. The method of claim 8, wherein modifying the message based on the range of predetermined permissible challenge values comprises modifying an input message to generate encoded values for applying to the PUF device that more fully encompass the range of predetermined permissible challenge values than the input message would encompass.

10. A device comprising:
    a physical unclonable function (PUF) device; and
    a processor coupled to the PUF device, the processor configured to
    obtain a message and, before applying the message to the PUF device, modify the message based on a range of challenge values that depends on a physical configuration of the PUF device;
    apply the modified message to the PUF device to obtain a response value;
    obtain a cryptographic key from the response value; and
    perform a cryptographic operation on the modified message using the cryptographic key.

11. The device of claim 10, wherein the processor is further configured to (a) sequentially apply segments of the modified message to the PUF device to obtain corresponding response values, (b) obtain corresponding cryptographic keys from the response values, and (c) perform the cryptographic operation on the segments of the modified message using the corresponding cryptographic keys.

12. The device of claim 11, wherein the processor is configured to sequentially apply the segments of the modified message to the PUF device to obtain the corresponding response values by:
    obtaining bits of a segment of the modified message for each segment of the modified message; and
    applying the bits of the segment of the modified message to the PUF device to obtain a particular response value of a series of corresponding response values.

13. The device of claim 11, wherein the processor is configured to perform the cryptographic operation on segments of the modified message using the corresponding cryptographic keys by applying a cryptographic key of a series of cryptographic keys to a cryptographic engine along with the same or a different segment of the modified message to obtain an encrypted or decrypted value.

14. The device of claim 13, wherein the processor is configured to apply the cryptographic key of the series of corresponding cryptographic keys to the cryptographic engine and is further configured to that a previous segment of the modified message encrypts or decrypts a subsequent segment of the modified message.

15. The device of claim 10, wherein the cryptographic operation that the processor is configured to perform is decryption or encryption.

16. The device of claim 15, further comprising:
wherein the cryptographic operation is decryption, the processor is configured to initially obtain a message to be decrypted that had been encrypted using a logical copy of the PUF device; or
wherein the cryptographic operation is encryption, the processor subsequently sends an encrypted message to a device equipped with the logical copy of the PUF device.

17. The device of claim 10, wherein the physical configuration of the PUF device corresponds to a range of predetermined permissible challenge values, and wherein the processor is configured to modify the message based on the range of predetermined permissible challenge values of the PUF device.

18. The device of claim 17, wherein the processor is configured to modify the message based on the range of predetermined permissible challenge values by modifying an input message to generate encoded values for applying to the PUF device that more fully encompass the range of predetermined permissible challenge values than the input message would encompass.

19. A method for use with a logical copy of a physical unclonable function (PUF) device, the method comprising:
obtaining a cryptographic message that was cryptographically-generated from an initial message by (a) modifying the initial message based on a range of challenge values that depends on a physical configuration of the PUF device, (b) applying the modified message to the PUF device to obtain a response value, and (c) cryptographically generating the cryptographic message based on the response value;
applying the cryptographic message to a logical copy of the PUF device to obtain a corresponding response value;
obtaining a cryptographic key from the corresponding response value;
performing a cryptographic operation on the cryptographic message using the cryptographic key to recover the modified message; and
recovering the initial message from the modified message by reversing the modifications made to the initial message.

20. The method of claim 19, wherein segments of the cryptographic message are applied sequentially to the logical copy of the PUF device to obtain corresponding response values, corresponding cryptographic keys are obtained from the response values, and the cryptographic operation is then performed on the segments of the cryptographic message using the corresponding cryptographic keys.

21. The method of claim 20, wherein the segments of the cryptographic message are applied sequentially to the logical copy of the PUF device to obtain the corresponding response values by:
obtaining bits of a segment of the cryptographic message for each segment of the cryptographic message; and
applying the bits of the segment of the cryptographic message to the logical copy of the PUF device to obtain a particular response value of a series of corresponding response values.

22. The method of claim 20, wherein a cryptographic key of a series of corresponding cryptographic keys is applied to the cryptographic engine and a previous segment of the cryptographic message encrypts or decrypts a subsequent segment of the cryptographic message.

23. The method of claim 19, wherein the cryptographic operation is decryption or encryption.

24. The method of claim 23, further comprising:
wherein the cryptographic operation is decryption and the cryptographic message is an encrypted message that had been encrypted using the PUF device.

25. The method of claim 19, wherein the physical configuration of the PUF device corresponds to a range of predetermined permissible challenge values, and wherein modifying the initial message includes modifying the initial message based on the range of predetermined permissible challenge values of the PUF device.

26. The method of claim 25, wherein modifying the initial message based on the range of predetermined permissible challenge values comprises modifying the initial message to generate encoded values for applying to the PUF device that more fully encompass the range of predetermined permissible challenge values than the initial message would encompass.

27. A device, comprising:
a logical copy of a physical unclonable function (PUF) device; and
a processor coupled to the logical copy of the PUF device, the processor configured to
obtain a cryptographic message that was cryptographically-generated from an initial message by (a) modifying the initial message based on a range of challenge values that depends on a physical configuration of the PUF device, (b) applying the modified message to the PUF device to obtain a response value, and (c) cryptographically generating the cryptographic message based on the response value;
apply the cryptographic message to the logical copy of a PUF device to obtain a corresponding response value;
obtain a cryptographic key from the corresponding response value;
perform a cryptographic operation on the cryptographic message using the cryptographic key to recover the modified message; and
recover the initial message from the modified message by reversing the modifications made to the initial message.

28. The device of claim 27, wherein the processor is further configured to (a) sequentially apply segments of the cryptographic message to the logical copy of the PUF device to obtain corresponding response values, (b) obtain corresponding cryptographic keys from the response values, and (c) perform the cryptographic operation on the segments of the cryptographic message using the corresponding cryptographic keys.

29. The device of claim 27, wherein the physical configuration of the PUF device corresponds to a range of predetermined permissible challenge values, and wherein the initial message was modified based on the range of predetermined permissible challenge values of the PUF device.

30. The device of claim 29, wherein the initial message was modified based on the range of predetermined permissible challenge values by modifying the initial message to generate encoded values for applying to the PUF device that more fully encompassed the range of predetermined permissible challenge values than the initial message would have encompassed.

* * * * *